US012706052B2

(12) United States Patent
Park et al.

(10) Patent No.: US 12,706,052 B2
(45) Date of Patent: Aug. 11, 2026

(54) GATE DRIVING CIRCUIT AND DISPLAY DEVICE

(71) Applicant: LG Display Co., Ltd., Seoul (KR)

(72) Inventors: SungMin Park, Paju-si (KR); TaeKyeong Lee, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/941,630

(22) Filed: Nov. 8, 2024

(65) Prior Publication Data

US 2025/0157411 A1 May 15, 2025

(30) Foreign Application Priority Data

Nov. 9, 2023 (KR) ........................ 10-2023-0154718
Jul. 30, 2024 (KR) ........................ 10-2024-0101062

(51) Int. Cl.
*G09G 3/32* (2016.01)
*G09G 3/3266* (2016.01)
*G09G 3/36* (2006.01)

(52) U.S. Cl.
CPC ............. *G09G 3/3266* (2013.01); *G09G 3/32* (2013.01); *G09G 3/3674* (2013.01); *G09G 2300/0408* (2013.01); *G09G 2300/0819* (2013.01); *G09G 2300/0842* (2013.01); *G09G 2300/0861* (2013.01); *G09G 2310/0202* (2013.01); *G09G 2310/0286* (2013.01); *G09G 2310/0291* (2013.01); *G09G 2310/067* (2013.01);
(Continued)

(58) Field of Classification Search
CPC ......... G09G 3/3233; G09G 2300/0861; G09G 2300/0819; G09G 3/3266; G09G 3/32; G09G 2310/0267; G09G 2310/0286; G09G 2310/0202; G09G 2310/0205; G09G 3/3674; G09G 2320/0247; G09G 2320/0242; G09G 2310/067; G09G 2320/0252; G09G 2320/0233
See application file for complete search history.

(56) References Cited

U.S. PATENT DOCUMENTS

2010/0149157 A1* 6/2010 Shih .................... G02F 1/13624
345/55
2011/0090200 A1* 4/2011 Choi .................... G09G 3/3233
345/76
(Continued)

FOREIGN PATENT DOCUMENTS

| | | | |
|---|---|---|---|
| CN | 109427298 | A | 3/2019 |
| CN | 115472128 | A | 12/2022 |
| KR | 10-2023-0015037 | A | 1/2023 |

*Primary Examiner* — Dismery Mercedes
(74) *Attorney, Agent, or Firm* — Seed Intellectual Property Law Group LLP

(57) ABSTRACT

Embodiments of the present disclosure are related to a gate driving circuit and a display device. Specifically, a compensation signal corresponding to a change in gate low voltage in a scan period may be applied to at least one gate line among the plurality of gate lines in each of at least one compensation period excluding a scan period during which the scan signal is applied to the plurality of gate lines during the display driving period. Accordingly, it is possible to provide a gate driving circuit and a display device capable of implementing low-power driving and improved image quality by reducing flicker due to the decrease in luminance during low-speed driving.

10 Claims, 15 Drawing Sheets

(52) U.S. Cl.
CPC . *G09G 2310/08* (2013.01); *G09G 2320/0247* (2013.01); *G09G 2330/021* (2013.01)

(56) References Cited

U.S. PATENT DOCUMENTS

| | | | | |
|---|---|---|---|---|
| 2011/0141086 | A1* | 6/2011 | Huang | G09G 3/344 345/107 |
| 2012/0293496 | A1* | 11/2012 | Park | G09G 3/003 345/212 |
| 2013/0127932 | A1* | 5/2013 | Han | G09G 3/3233 345/212 |
| 2013/0328839 | A1* | 12/2013 | Jamal | G09G 3/3648 345/204 |
| 2014/0071108 | A1* | 3/2014 | Han | G09G 3/3208 345/76 |
| 2016/0071493 | A1* | 3/2016 | Yoshiga | G09G 3/3648 345/213 |
| 2017/0124941 | A1* | 5/2017 | Na | G09G 3/2092 |
| 2017/0270879 | A1* | 9/2017 | Han | G11C 19/28 |
| 2017/0301289 | A1 | 10/2017 | Jeong | |
| 2018/0061293 | A1* | 3/2018 | Park | G09G 3/3233 |
| 2019/0035349 | A1* | 1/2019 | Jeong | G02F 1/136286 |
| 2020/0074931 | A1* | 3/2020 | Yang | G09G 3/3225 |
| 2020/0082768 | A1 | 3/2020 | Oh et al. | |
| 2020/0168150 | A1 | 5/2020 | Lin et al. | |
| 2022/0069044 | A1* | 3/2022 | Kwak | H10K 59/1213 |
| 2022/0301496 | A1* | 9/2022 | Park | G11C 19/28 |
| 2022/0319426 | A1* | 10/2022 | Yin | G09G 3/3233 |
| 2022/0398978 | A1 | 12/2022 | Kim et al. | |
| 2023/0116559 | A1* | 4/2023 | Park | G09G 3/3233 345/204 |
| 2023/0386394 | A1* | 11/2023 | Hashimoto | G09G 3/3258 |

* cited by examiner

GATE DRIVING CIRCUIT AND DISPLAY DEVICE

CROSS REFERENCE TO RELATED APPLICATION

This application claims priority from Korean Patent Application No. 10-2023-0154718, filed on Nov. 9, 2023, and Korean Patent Application No. 10-2024-0101062, filed on Jul. 30, 2024, which are hereby incorporated by reference for all purposes as if fully set forth herein.

BACKGROUND

Technical Field

Embodiments of the present disclosure relate to a gate driving circuit and a display device.

Description of the Related Art

As the information society develops, there is increasing the demand for display devices for displaying images, and there are being utilized various types of display devices such as liquid crystal display devices and organic light emitting display devices.

Among these display devices, organic light emitting display devices may provide advantages in response speed, contrast ratio, luminance efficiency, luminance, and viewing angle by using organic light emitting diodes with self-luminous characteristics.

The organic light emitting display device may control the current flowing to the organic light emitting diode (OLED) arranged in each subpixel of a display panel to emit light, and control the luminance displayed by each subpixel, thereby being able to display images.

Here, the current flowing to the organic light emitting diode during a period in which the organic light emitting diode emits light may decrease due to off current in the subpixel, and the brightness displayed by the organic light emitting diode may decrease due to a decrease in the amount of current driving the organic light emitting diode.

In particular, if a display device is driven at a low display driving frequency to reduce power consumption, the degree of decrease in luminance during the light emission period may increase, so that there may be a problem that the decrease in luminance may be recognized as a flicker.

BRIEF SUMMARY

Embodiments of the present disclosure may provide a gate driving circuit and a display device capable of implementing low-power operation and improved image quality by, among others, reducing flicker due to the decrease in luminance during low-speed driving.

Embodiments of the present disclosure may provide a gate driving circuit and a display device capable of performing a high frequency compensation for a gate low voltage VGL which slightly increases by a predetermined length before and after a turn-on timing of a scan signal during low-speed driving.

Embodiments of the present disclosure may provide a gate driving circuit and a display device capable of improving the phenomenon of flicker being perceived differently between areas of the display panel through the high frequency compensation.

Embodiments of the present disclosure may provide a display device including a display panel on which a plurality of gate lines, a plurality of data lines and a plurality of subpixels are disposed, a gate driving circuit for supplying a scan signal to the plurality of gate lines during a display driving period, and a data driving circuit for supplying a data voltage to the plurality of data lines.

The gate driving circuit may apply a compensation signal corresponding to a change in gate low voltage in a scan period to at least one gate line among the plurality of gate lines in each of at least one compensation period excluding a scan period during which the scan signal is applied to the plurality of gate lines during the display driving period.

A gate driving circuit according to embodiments of the present disclosure may include a buffer circuit including a pull-up transistor connected between a first node and a second node and a pull-down transistor connected between a third node and the second node, and a control circuit configured to control a voltage of a first control node which is a gate node of the pull-up transistor, and a voltage of a second control node which is a gate node of the pull-down transistor.

The buffer circuit may output a gate signal to a gate line electrically connected to the second node. One of a first power voltage applied to the first node and a second power voltage applied to the third node may be a gate low voltage, and the other may be a gate high voltage higher than the gate low voltage.

The gate low voltage may change between a first voltage level and a second voltage level higher than the first voltage level over time, and may have the second voltage level during a period in which the gate signal has a turn-on level voltage.

The gate signal may include a first signal section having a variable gate high voltage higher than the gate high voltage, a second signal section having the gate low voltage of the second voltage level, and a third signal section having the gate low voltage of the first voltage level.

A display device according to embodiments of the present disclosure may include a display panel on which a plurality of gate lines, a plurality of data lines and a plurality of subpixels are disposed, and a gate driving circuit configured to supply a gate signal to the plurality of gate lines.

The gate driving circuit may supply the gate signal including a first signal section having a variable gate high voltage higher than the gate high voltage, a second signal section having the gate low voltage at a second voltage level, and a third signal section having the gate low voltage at a first voltage level lower than the second voltage level.

According to embodiments of the present disclosure, it is possible to provide a gate driving circuit and a display device capable of implementing low-power operation and improved image quality by reducing flicker due to the decrease in luminance during low-speed driving.

According to embodiments of the present disclosure, it is possible to provide a gate driving circuit and a display device capable of performing a high frequency compensation for a gate low voltage VGL which slightly increases by a predetermined length before and after a turn-on timing of a scan signal during low-speed driving.

According to embodiments of the present disclosure, it is possible to provide a gate driving circuit and a display device capable of improving the phenomenon of flicker being perceived differently between areas of the display panel through the high frequency compensation.

DETAILED DESCRIPTION

Figure 1:
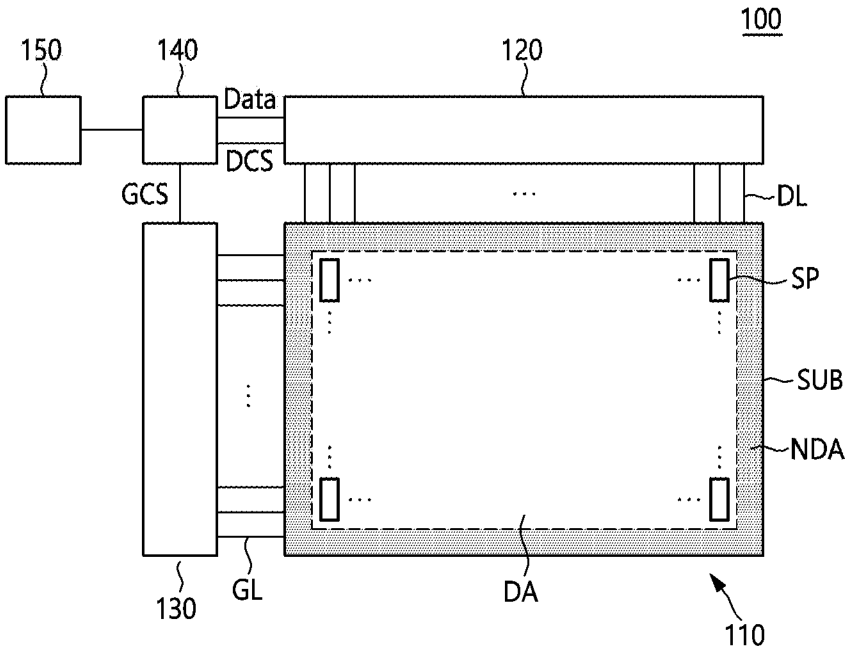
FIG. 1 is a diagram for explaining a display device according to embodiments of the present disclosure.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including," "having," "containing," "constituting" "make up of," and "formed of" used herein are generally intended to allow other components to be added unless the terms are used with the term "only." As used herein, singular forms are intended to include plural forms unless the context clearly indicates otherwise.

Terms, such as "first," "second," "A," "B," "(A)," or "(B)" may be used herein to describe elements of the present disclosure. Each of these terms is not used to define essence, order, sequence, or number of elements, etc., but is used merely to distinguish the corresponding element from other elements.

When it is mentioned that a first element "is connected or coupled to," "contacts or overlaps," etc., a second element, it should be interpreted that, not only can the first element "be directly connected or coupled to" or "directly contact or overlap" the second element, but a third element can also be "interposed" between the first and second elements, or the first and second elements can "be connected or coupled to," "contact or overlap," etc., each other via a fourth element. Here, the second element may be included in at least one of two or more elements that "are connected or coupled to," "contact or overlap," etc., each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes, etc., are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Hereinafter, it will be described various embodiments of the disclosure in detail with reference to the accompanying drawings.

FIG. 1 is a diagram for explaining a display device according to embodiments of the present disclosure.

Referring to FIG. 1, a display device 100 according to embodiments of the present disclosure may include a display panel 110 including a plurality of subpixels SP, and a driving circuit for driving a plurality of subpixels SP included in the display panel 110.

The driving circuit may include a data driving circuit 120 and a gate driving circuit 130, and may further include a controller 140 for controlling the data driving circuit 120 and the gate driving circuit 130.

The display panel 110 may include a substrate SUB, and signal lines such as a plurality of data lines DL and a plurality of gate lines GL arranged on the substrate SUB. The plurality of data lines DL and the plurality of gate lines GL may be connected to a plurality of subpixels SP.

The display panel 110 may include a display area DA where an image is displayed and a non-display area NDA where an image is not displayed. In the display area DA of the display panel 110, a plurality of subpixels SP for displaying an image are disposed, and in the non-display area NDA, driving circuits 120, 130 and 140 may be electrically connected, or driving circuits 120, 130 and 140 may be mounted, and a pad portion to which an integrated circuit or a printed circuit is connected may be disposed.

The data driving circuit 120 may be a circuit for driving a plurality of data lines DL, and may supply data signals to the plurality of data lines DL.

The gate driving circuit 130 may be a circuit for driving a plurality of gate lines GL, and may supply a gate signal to the plurality of gate lines GL.

The controller 140 may supply a data control signal DCS to the data driving circuit 120 to control the operation timing of the data driving circuit 120, and may supply a gate control signal GCS to the gate driving circuit 130 to control the operation timing of the gate driving circuit 130.

The controller 140 may start scanning according to the timing implemented in each frame, convert the input image data input from the outside into a data signal format used by the data driving circuit 120, supply the converted image data Data to the data driving circuit 120, and control the data driving at an appropriate time according to the scan.

The controller 140 may receive various timing signals including a vertical synchronization signal VSYNC, a horizontal synchronization signal HSYNC, an input data enable signal DE, and a clock signal CLK, along with the input image data, from the outside (e.g., the host system 150).

The controller 140 may receive timing signals such as a vertical synchronization signal VSYNC, a horizontal synchronization signal HSYNC, an input data enable signal DE, and a clock signal CLK to control the data driving circuit 120 and the gate driving circuit 130, generate various control signals DCS and GCS, and output the control signals to the data driving circuit 120 and the gate driving circuit 130.

For example, the controller 140 may output various gate control signals GCS including a gate start pulse GSP, a gate shift clock GSC, and a gate output enable signal GOE to control the gate driving circuit 130.

In addition, the controller 140 may output various data control signals DCS including a source start pulse SSP, a source sampling clock SSC, a source output enable signal SOE to control the data driving circuit 120.

The controller 140 may be implemented as a separate component from the data driving circuit 120, or may be implemented as an integrated circuit by being integrated with the data driving circuit 120.

The controller 140 may be a timing controller used in conventional display technology, or may be a control device that can perform other control functions including a timing controller, may be a control device other than the timing controller, or may be a circuit within the control device. The controller 140 may be implemented as various circuits or electronic components such as an integrate circuit (IC), an Field Programmable Gate Array (FPGA), an Application Specific Integrated Circuit (ASIC), or a processor.

The display device 100 according to the embodiments of the present disclosure may further include a power management integrated circuit PMIC, and for convenience of explanation, the controller 140 and/or the power management integrated circuit PMIC may be described as a driver integrated circuit D-IC hereinafter.

The data driving circuit 120 may receive image data Data from the controller 140 and supply data voltages to a plurality of data lines DL, thereby driving a plurality of data lines DL. Here, the data driving circuit 120 may also be referred to as a source driving circuit.

The data driving circuit 120 may include at least one source driver integrated circuit SDIC.

Each source driver integrated circuit may include a shift register, a latch circuit, a digital to analog converter DAC, and an output buffer. Each source driver integrated circuit may further include an analog to digital converter ADC, depending on the case.

For example, each source driver integrated circuit may be connected to the display panel 110 in a tape-automated-bonding (TAB) manner, may be connected to a bonding pad of the display panel 110 in a chip-on-glass (COG) or chip-on-panel (COP) manner, or may be implemented in a chip-on-film (COF) manner and connected to the display panel 110.

The gate driving circuit 130 may output a gate signal of a turn-on voltage level or a gate signal of a turn-off voltage level according to the control of the controller 140. The gate driving circuit 130 may sequentially drive a plurality of gate lines GL by sequentially supplying gate signals of a turn-on voltage level to a plurality of gate lines GL.

The gate driving circuit 130 according to the embodiments of the present disclosure may supply the scan signals (e.g., first to third scan signals, etc.) to a plurality of gate lines GL for each preset display driving period D/P.

For example, the display driving period D/P may be a period corresponding to a driving mode of the display device 100. In addition, if it is assumed that the display device 100 is driven at a low speed of 10 Hz, the display driving period D/P may be set to 10 Hz (i.e., 0.1 s).

The display driving period D/P may include a scan period S/P in which a first scan signal is applied to a plurality of gate lines GL, and at least one compensation period C/P in which a compensation signal corresponding to a change in gate low voltage VGL in the scan period S/P is applied to at least one gate line among the plurality of gate lines GL.

The gate driving circuit 130 may be connected to the display panel 110 in a tape-automated-bonding (TAB) manner, may be connected to a bonding pad of the display panel 110 in a chip-on-glass (COG) or chip-on-panel (COP) manner, or may be connected to the display panel 110 in a chip-on-film (COF) manner. Alternatively, the gate driving circuit 130 may be formed in a non-display area NDA of the display panel 110 as a gate-in-panel (GIP) type. The gate driving circuit 130 may be disposed on the substrate SUB or connected to the substrate SUB. That is, the gate driving circuit 130 may be disposed in the non-display area NDA of the substrate SUB if it is a GIP type. The gate driving circuit 130 may be connected to the substrate SUB if it is a chip-on-glass (COG) type, or a chip-on-film (COF) type.

The gate driving circuit 130 according to the embodiments of the present disclosure may receive a gate voltage and a compensation signal from a driver integrated circuit D-IC disposed outside the display panel 100 when implemented as at least one GIP circuit disposed within the display panel 100, and may generate a scan signal based on the gate voltage.

For example, the gate voltage may include at least one of a gate high voltage VGH and a gate low voltage VGL.

In addition, the gate voltage may further include at least one of an emission high voltage VEH and an emission low voltage VEH.

Here, the driver integrated circuit D-IC may generate a compensation signal based on the gate low voltage VGL and provide the compensation signal to the gate driving circuit 130.

Meanwhile, at least one of the data driving circuit 120 and the gate driving circuit 130 may be disposed in the display area DA. For example, at least one of the data driving circuit 120 and the gate driving circuit 130 may be disposed so as not to overlap with the subpixels SP, or may be disposed so as to partially or completely overlap with the subpixels SP.

If a gate line GL selected by the gate driving circuit 130 is driven, the data driving circuit 120 may convert the image data Data received from the controller 140 into an analog data voltage and supply the converted image data to a plurality of data lines DL.

The data driving circuit 120 may be connected to one side (e.g., the upper side or the lower side) of the display panel 110. Depending on the driving method and the panel design method, the data driving circuit 120 may be connected to both sides (e.g., the upper side and the lower side) of the display panel 110, or may be connected to two or more of the four sides of the display panel 110.

The gate driving circuit 130 may be connected to one side (e.g., the left side or the right side) of the display panel 110.

Depending on the gate driving method and the panel design method, the gate driving circuit 130 may be connected to both sides (e.g., the left side and the right side) of the display panel 110, or may be connected to two or more of the four sides of the display panel 110.

The controller 140 may be mounted on a printed circuit board, a flexible printed circuit, etc., and may be electrically connected to the data driving circuit 120 and the gate driving circuit 130 through the printed circuit board, the flexible printed circuit, etc.

The controller 140 may transmit and receive signals with the data driving circuit 120 according to one or more predefined interfaces. Here, for example, the interface may include an Low Voltage Differential Signaling (LVDS) interface, an Embedded Clock Point to Point Interface (EPI), an a Serial Peripheral Interface (SPI), etc.

The controller 140 may include one or more memory media such as registers.

The display device 100 according to the embodiments of the present disclosure may be a display including a backlight unit such as a liquid crystal display, or may be a self-luminous display such as an organic light emitting display, a quantum dot display, an inorganic light emitting display, etc.

If the display device 100 is an organic light emitting display device, each subpixel SP may include an organic light emitting diode (OLED) that emits light by itself as a light emitting device.

If the display device 100 is a quantum dot display device, each subpixel SP may include a light emitting device made of a quantum dot, which is a semiconductor crystal emitting light by itself.

If the display device 100 is an inorganic light emitting display device, each subpixel SP may include an inorganic light emitting device, which emits light by itself and is made based on an inorganic material, as a light emitting device. For example, an inorganic light emitting device may be also referred to as a micro light emitting diode, and an inorganic light emitting display device may be also referred to as a micro LED display device.

Figure 2:
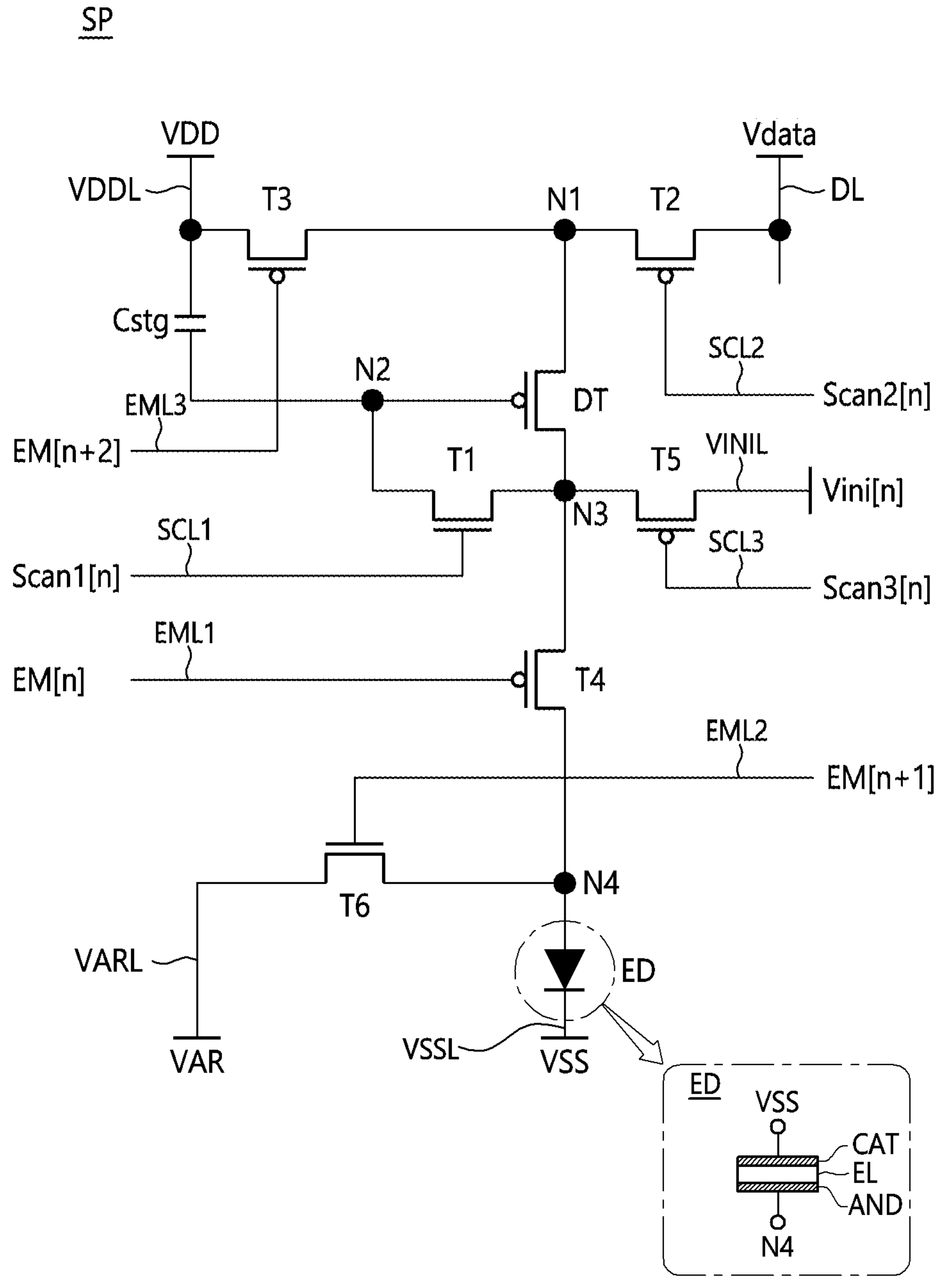
FIG. 2 illustrates an example of a subpixel SP circuit disposed in a display panel according to embodiments of the present disclosure.

FIG. 2 illustrates an example of a subpixel SP circuit disposed in a display panel 110 according to embodiments of the present disclosure.

Referring to FIG. 2, the subpixel SP may include a light emitting device ED and a driving transistor DT configured to drive the light emitting device ED. For example, the light emitting device ED may be an organic light emitting device.

The subpixel SP may further include one or more transistors in addition to the driving transistor DT, and the subpixel SP may include one or more oxide semiconductor transistors.

The subpixel SP may include a driving transistor DT and first to sixth transistors T1-T6. Each of the transistors may be a P-type transistor or an N-type transistor.

The N-type transistor may be an oxide transistor formed using a semiconductor oxide (for example, a transistor having a channel formed from a semiconductor oxide such as indium, gallium, zinc oxide, or IGZO). The P-type transistor may be a silicon transistor formed from a semiconductor such as silicon (e.g., a transistor having a polysilicon channel formed using a low-temperature process referred to as LTPS or low-temperature polysilicon).

An oxide transistor has a characteristic of relatively lower leakage current than a silicon transistor. Accordingly, there may be relatively advantageous to implement a low refresh frame rate.

The subpixel SP may further include a storage capacitor Cstg configured to apply a high-potential driving voltage VDD applied from a high-potential driving voltage line VDDL to a gate node of the driving transistor DT for one frame period.

As illustrated in FIG. 2, the structure of a subpixel SP including seven transistors and one capacitor may be called a 7T1C structure.

Hereinafter, for convenience of explanation, the structure of the subpixel SP is exemplified as a 7T1C structure, but the embodiments of the present disclosure are not limited thereto, and may be easily applied to subpixel circuits of various structures such as a 3T1C structure, an 8TO2 structure (e.g., LTPS TFT+ Oxide TFT).

That is, the structure of the subpixel SP may be designed in various ways depending on the arrangement of the transistor and capacitor even if it has a 7T1C structure.

The storage capacitor Cstg may include one end electrically connected to a second node N2 of the driving transistor DT and the other end electrically connected to the high-potential driving voltage line VDDL. The other end of the storage capacitor Cstg may be electrically connected to either a source node or a drain node of a third transistor T3. The second node N2 of the driving transistor DT may be a gate node of the driving transistor DT.

A first transistor T1 may be electrically connected between the second node N2 and a third node N3 of the driving transistor DT. The operation timing of the third transistor T3 may be controlled by a first scan signal Scan1[n] applied from a first scan signal line SCL1 (where n is a positive integer). The third node N3 of the driving transistor DT may be either the source node or the drain node of the driving transistor DT.

The first transistor T1 may be an oxide transistor. Due to the low leakage current characteristic of the oxide transistor, the voltage level of the second node N2 of the driving transistor DT may be maintained constant. Accordingly, even if the data voltage Vdata for image display is not applied for each frame, the subpixel SP may display an image based on the data voltage Vdata input in the previous frame.

A second transistor T2 may be configured to switch an electrical connection between the first node N1 of the driving transistor DT and a data line DL. The first node N1 of the driving transistor DT may be another one of the source node or the drain node of the driving transistor DT. The operation timing of the second transistor T2 may be controlled by the second scan signal Scan2[n] applied from a second scan signal line SCL2. When the second scan signal Scan2[n] of the turn-on voltage level is applied to the second transistor T2, the data voltage Vdata may be applied from the data line DL to the first node N1 of the driving transistor DT.

A third transistor T3 may be configured to switch an electrical connection between the first node N1 of the driving transistor DT and the high-potential driving voltage line VDDL. The operation timing of the third transistor T3 may be controlled by a third emission control signal EM[n+2] applied from a third emission control signal line EML3. When the third emission control signal EM[n+2] of the turn-on voltage level is applied to the third transistor T3, a high-potential driving voltage VDD may be applied to the first node N1 of the driving transistor DT.

A fourth transistor T4 may be configured to switch the electrical connection between the third node N3 of the driving transistor DT and a first electrode of the light emitting device ED. The operation timing of the fourth transistor T4 may be controlled by a first emission control signal EM[n] applied from a first emission control signal line EML1.

The fourth transistor T4 may include a fourth node N4, and the fourth node N4 of the fourth transistor T4 may be electrically connected to the first electrode of the light emitting device ED.

The fourth node N4 of the fourth transistor T4 may be a source node or a drain node of the fourth transistor T4. The first electrode of the light emitting device ED may be an anode electrode or a cathode electrode. Hereinafter, it will be explained assuming that the first electrode of the light emitting device ED is the anode electrode.

A fifth transistor T5 may be configured to switch an electrical connection between the third node N3 of the driving transistor DT and an initialization voltage line VINIL. The driving timing of the fifth transistor T5 may be controlled by a third scan signal Scan3[n]. When the third scan signal Scan3[n] of the turn-on voltage level is applied, an initialization voltage Vini[n] may be applied to the third node N3 of the driving transistor DT from the initialization voltage line VINIL.

A sixth transistor T6 may be configured to switch an electrical connection between the first electrode of the light emitting device ED and a reset voltage line VARL. If the first electrode of the light emitting device ED is the anode electrode, a reset voltage VAR applied from the reset voltage line VARL may be an anode reset voltage.

The operation timing of the sixth transistor T6 may be controlled by a second emission control signal EM[n+1] applied from a second emission control signal line EML2.

The gate driving circuit 130 according to the embodiments of the present disclosure may generate a plurality of scan signals including a first scan signal Scan1[n], a second scan signal Scan2[n], and a third scan signal Scan3[n], and a plurality of emission control signals including a first emission control signal EM[n], a second emission control signal EM[n+1], and a third emission control signal EM[n+2], and may supply each of the plurality of scan signals and the plurality of emission control signals to at least one corresponding subpixel among the plurality of subpixels SP.

The first electrode of the light emitting device ED may be electrically connected to the fourth node N4 of the fourth transistor T4, and a second electrode may be electrically connected to a low-potential driving voltage line VSSL which applies a low-potential driving voltage VSS. The first electrode of the light emitting device ED may be either an anode electrode AND or a cathode electrode CAT, and the second electrode may be the other of the anode electrode AND or the cathode electrode CAT. The light emitting device ED may further include an emission layer EL provided between the anode electrode AND and the cathode electrode CAT.

The high-potential driving voltage line VDDL and the low-potential driving voltage line VSSL may be common voltage lines that are commonly connected to a plurality of subpixels SP arranged on the display panel 110.

Referring to FIG. 2, the first transistor T1 and the sixth transistor T6 may be N-type transistors, and the driving transistor DT, the second transistor T2, the third transistor T3, the fourth transistor T4, and the fifth transistor T5 may be P-type transistors.

However, the embodiments of the present disclosure are not limited thereto, and at least one of the first transistor T1 and the sixth transistor T6 may be configured as a P-type transistor, or at least one of the driving transistor DT, the second transistor T2, the third transistor T3, the fourth transistor T4, and the fifth transistor T5 may be configured as an N-type transistor.

Figure 3A:
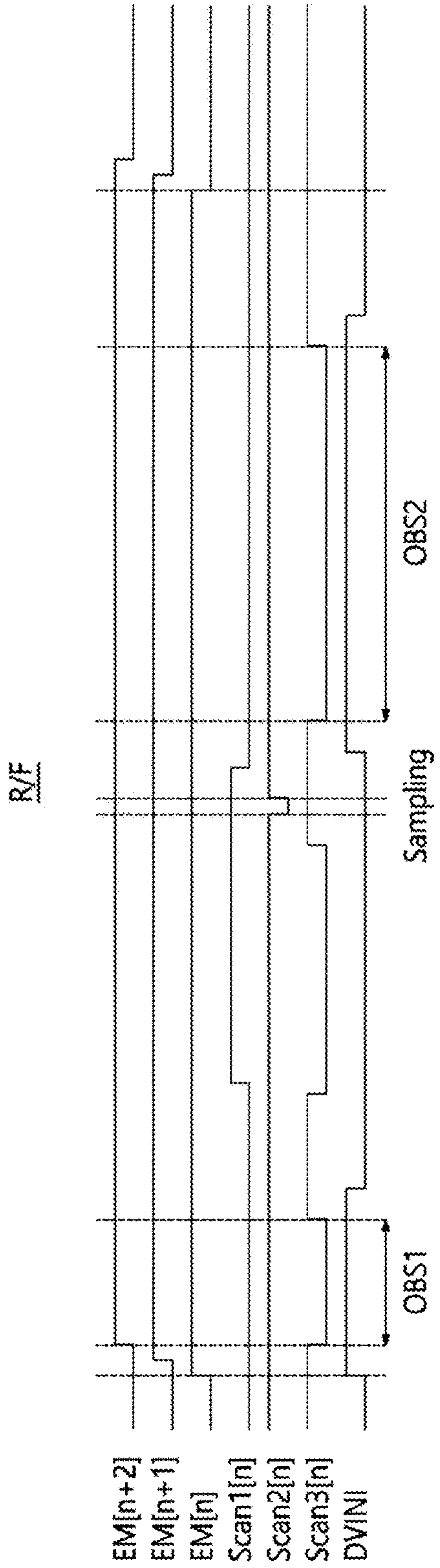
FIG. 3A and FIG. 3B are diagrams for explaining the operation timing of a subpixel circuit during a refresh frame period and an anode reset frame period in a display device according to embodiments of the present disclosure.
Figure 3B:
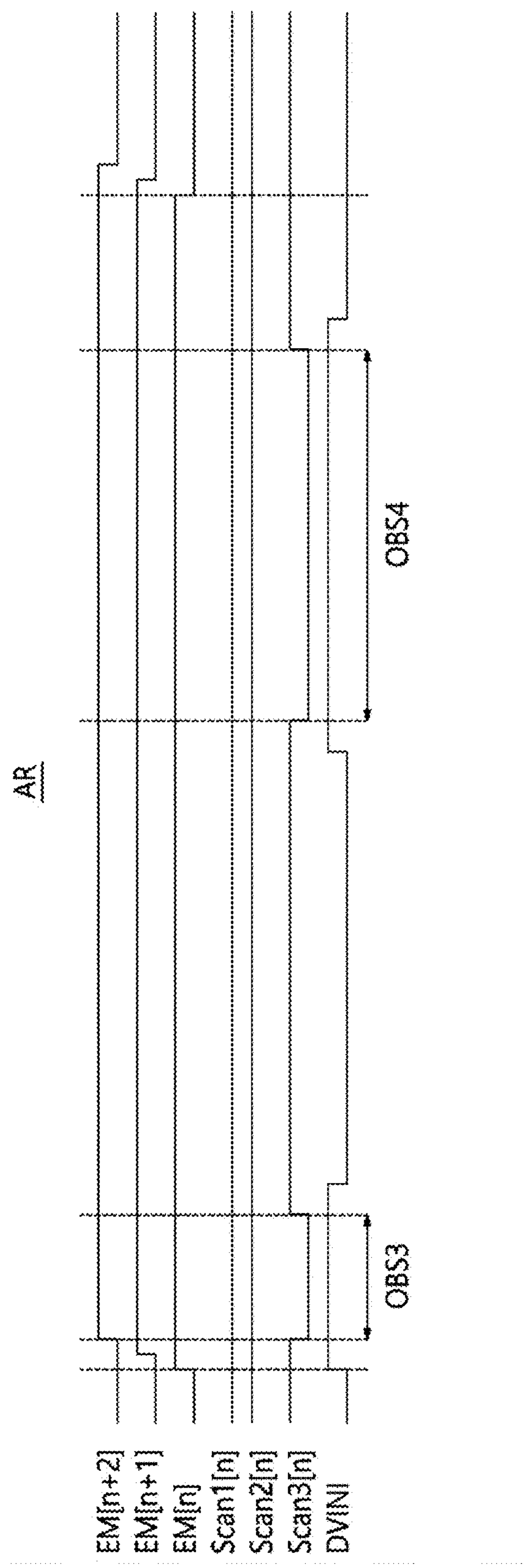

FIG. 3A and FIG. 3B are diagrams for explaining the operation timing of the subpixel SP circuit during a refresh frame R/F period and an anode reset frame AR period in the display device 100 according to embodiments of the present disclosure.

Specifically, FIG. 3A illustrates an operation timing diagram of the subpixel SP circuit during the refresh frame R/F period, and FIG. 3B illustrates an operation timing diagram of the subpixel SP circuit during the anode reset frame AR period. Hereinafter, it will be explained the operation timing of the subpixel SP according to the refresh frame R/F period and the anode reset frame AR period with reference to the subpixel SP circuit of FIG. 2.

Referring to FIG. 3A, the refresh frame R/F period may include a first on-bias period OBS1 and a second on-bias period OBS2 configured to apply an initialization voltage DVINI of a high voltage level to a third node N3 of the driving transistor DT, and a sampling period configured to apply a voltage corresponding to a data voltage Vdata to a second node N2 of the driving transistor DT. Here, the initialization voltage DVINI may be a DC voltage.

The on-bias periods OBS1 and OBS2 may be periods provided to alleviate a hysteresis effect that may occur in the driving transistor DT and to improve response characteristics.

During the sampling period, a third emission control signal EM[n+2] of a turn-off voltage level may be applied to the third transistor T3, a first emission control signal EM[n] of a turn-off voltage level may be applied to the fourth transistor T4, a third scan signal SCAN3 [n] of a turn-off voltage level may be applied to the fifth transistor T5, and a second emission control signal EM[n+1] of a turn-off voltage level may be applied to the sixth transistor T6.

During the sampling period, a first scan signal SCAN1[n] of a turn-on voltage level may be applied to the first transistor T1, and a second scan signal SCAN2[n] of a turn-on voltage level may be applied to the second transistor T2.

According to an embodiment of the present disclosure, during a process in which a first scan signal SCAN1[n] of a turn-on voltage level is applied to a first scan node (i.e., a gate node of a first transistor T1) during a sampling period, there may occur a phenomenon in which a gate low voltage VGL slightly increases or rises, and in response to this, the gate driving circuit 130 may supply a compensation signal corresponding to the increased gate low voltage level (e.g., VGL Rising level) which has risen at a first scan node during a plurality of compensation periods C/P after the sampling period.

That is, the gate driving circuit 130 may apply the first scan signal SCAN1[n] and the compensation signal to the gate node of the first transistor at different timings.

For example, when the level of the first scan signal SCAN1[n], that is, the gate high voltage VGH, is 10 V, the increased gate low voltage level (e.g., VGL Rising level) may be 150 mV or less.

Referring to FIG. 3A, when the first transistor T1 is turned on in the sampling period, the third node N3 and the second node N2 of the driving transistor DT may be electrically connected, and a voltage at the turn-on level may be applied to the second node N2 of the driving transistor DT.

During the sampling period, if the driving transistor DT, the first transistor T1 and the second transistor T2 are turned on, a voltage corresponding to the data voltage Vdata may be applied to the second node N2 of the driving transistor DT, and accordingly, a voltage corresponding to the data voltage Vdata may be applied to one end of the storage capacitor Cstg.

Referring to FIG. 3B, during the anode reset frame AR period, a third emission control signal EM[n+2] of a turn-off voltage level may be applied to the third transistor T3, and a first emission control signal EM[n] of a turn-off voltage level may be applied to the fourth transistor T4.

A first scan signal Scan1[n] of a turn-off voltage level may be applied to the first transistor T1. A second scan signal Scan2[n] of a turn-off voltage level may be applied to the second transistor T2. A second emission control signal EM[n+1] of a turn-on voltage level may be applied to the sixth transistor T6.

Meanwhile, a third scan signal Scan3[n] may be applied to the fifth transistor T5, and the third scan signal Scan3[n] may have a turn-on level voltage and a turn-off level voltage at least once during an anode reset frame AR period.

When the third scan signal Scan3[n] is at the turn-on voltage level, the fifth transistor T5 is turned on, and an initialization voltage DVINI of a high level voltage may be applied to the third node N3 of the driving transistor DT.

During the anode reset frame AR period, the period during which the initialization voltage DVINI of a high level voltage is applied to the third node N3 of the driving transistor DT may be a third on-bias period OBS3 and a fourth on-bias period OBS4.

When the second emission control signal EM[n+1] is at the turn-on level voltage, the sixth transistor T6 may be turned on, and an anode reset voltage VAR may be applied to the first electrode of the light emitting device ED.

Figure 4A:
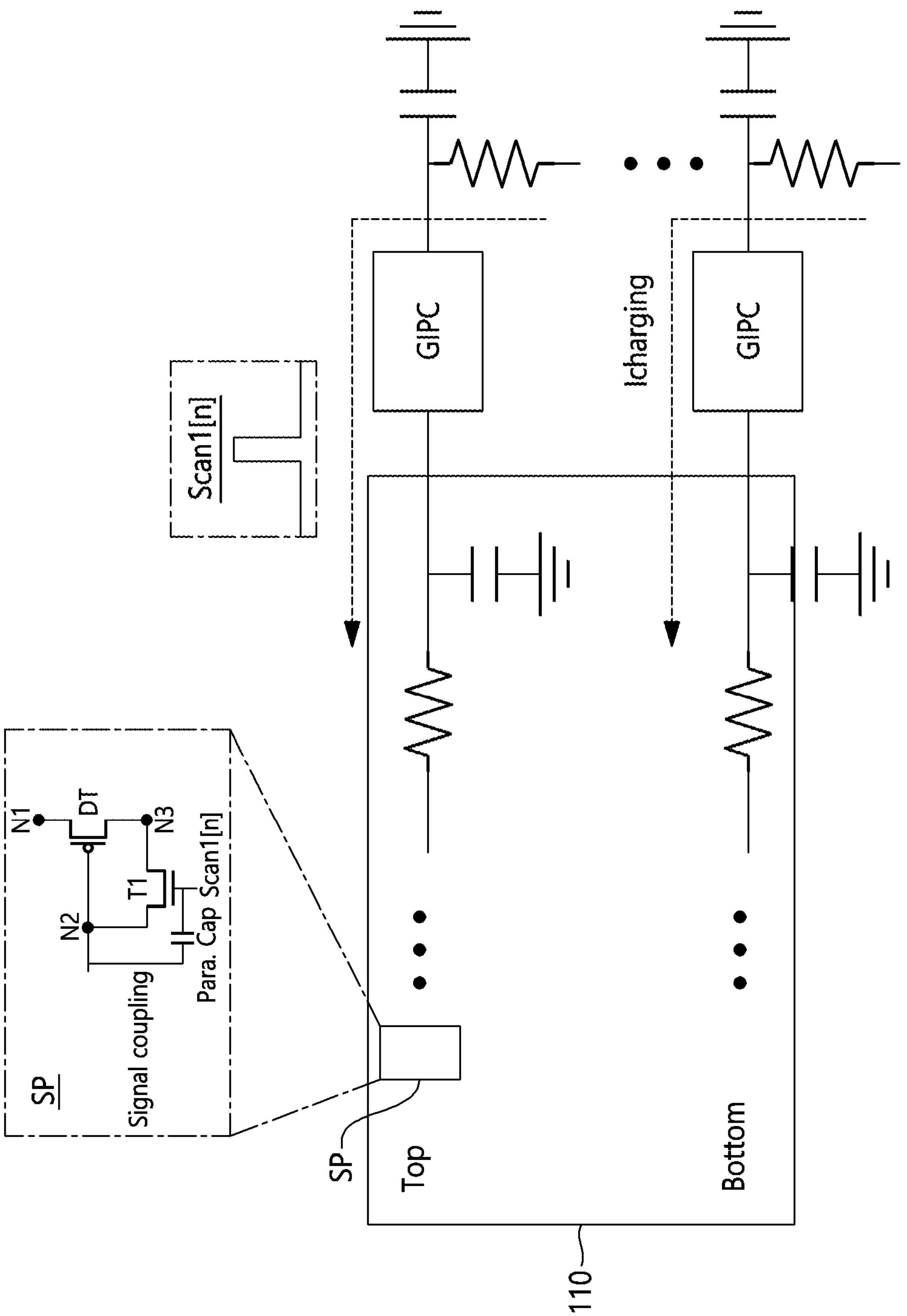
FIG. 4A and FIG. 4B are diagrams for explaining a phenomenon in which flicker occurs in a display panel according to embodiments of the present disclosure.
Figure 4B:
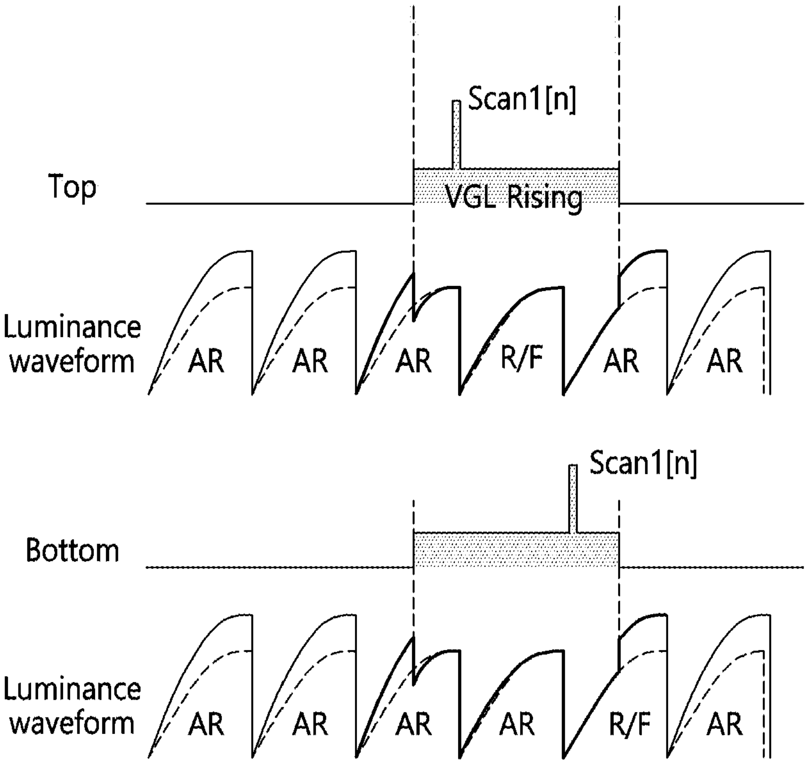

FIG. 4A and FIG. 4B are diagrams for explaining a phenomenon in which flicker occurs in a display panel 110 according to embodiments of the present disclosure.

Hereinafter, there is exemplified a case in which the gate driving circuit 130 is a GIP circuit GIPC, but the embodiments of the present disclosure are not limited thereto.

In addition, for convenience of explanation, there is exemplified a case in which the display panel 110 is divided into an upper region Top, a middle region Middle, and a lower region Bottom depending on the location.

For example, if it is assumed that a plurality of gate lines GL are composed of first to m-th gate lines (wherein, m is a positive integer) sequentially arranged in the −y axis direction in the plan view of FIG. 1, the upper region Top may mean an area where the first to k-th gate lines (wherein, k is a positive integer greater than 2) are arranged.

In addition, the middle region Middle may mean a region where the k+1 to 1-th gate lines (where 1 is a positive integer satisfying the condition of 1>k+1) are disposed, and the bottom region Bottom may mean a region where the 1+1 to m-th gate lines (where m is a positive integer satisfying the condition of m>1+1) are disposed.

Referring to FIG. 4A, the gate driving circuit 130 (e.g., GIPC) according to the embodiments of the present disclosure may supply a first scan signal Scan1[n] to a gate node (i.e., the first scan node) of the first transistor T1 of the subpixel SP through the gate line GL.

In this case, if the display device 100 is driven at a low speed (e.g., 10 Hz driving), due to a parasitic capacitor (e.g., Para. Cap) formed between the second node N2 and the gate node of the first transistor, there may occur a period (hereinafter, low voltage rising period) in which the gate low voltage VGL slightly rises or increases at the gate node of the first transistor T1 for a predetermined length, for example, 120 Hz, before and after the turn-on timing of the first scan signal SCAN1[N].

Referring to FIG. 4B, the low voltage rising period (e.g., VGL Rising) may occur during a scan period S/P in which a first scan signal SCAN1[N] is sequentially applied to each of a plurality of gate lines GL. In this case, the scan period S/P may include a refresh frame R/F period corresponding to the timing at which the first scan signal SCAN1[N] is applied and at least one anode reset frame AR period.

Referring to FIG. 4B, the low voltage rising period (i.e., VGL Rising) may affect the gate node (i.e., the second node N2) of the driving transistor DT, so that there may occur a phenomenon in which the brightness or luminance slightly decreases during the low voltage rising period (i.e., VGL Rising).

In particular, in the display panel 110, due to the difference in timing at which the first scan signal SCAN1[N] is applied to each of the plurality of gate lines GL, there may occur a phenomenon in which the luminance slightly decreases at different locations in the upper region Top, middle region Middle, and lower region Bottom of the panel, which may cause flicker distribution by location.

Accordingly, the gate driving circuit 130 according to the embodiments of the present disclosure may provide a compensation signal corresponding to the increased gate low voltage level in the low voltage rising period (i.e., VGL Rising) during a plurality of compensation periods different from the low voltage rising period (i.e., VGL Rising), thereby minimizing the occurrence of flicker.

Figure 5:
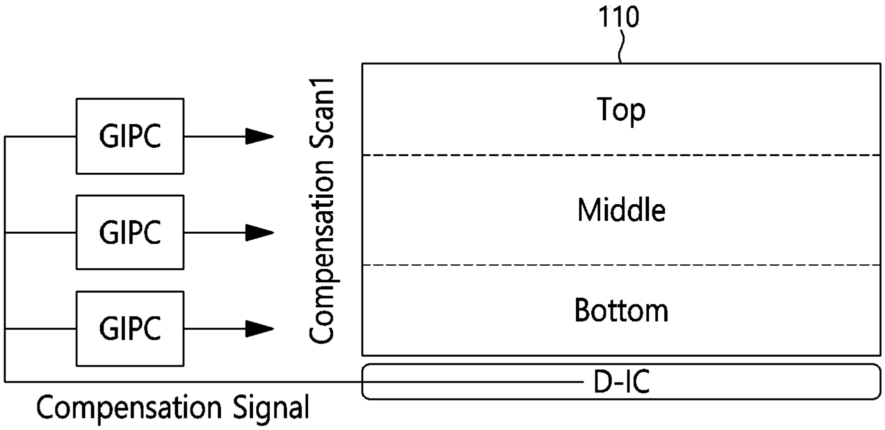
FIG. 5 is a diagram for explaining an example of performing high frequency compensation in a display device according to embodiments of the present disclosure.

FIG. 5 is a diagram for explaining an example of performing high frequency compensation in a display device 100 according to embodiments of the present disclosure.

Referring to FIG. 5, the gate driving circuit 130 may be composed of at least one GIP circuit GIPC, and may apply a compensation signal corresponding to the scan period to at least one gate line among the plurality of gate lines GL in each of at least one compensation period C/P excluding the scan period S/P in which the first scan signal Scan1[n] is applied to the plurality of gate lines GL during the display driving period D/P.

For example, the gate driving circuit 130 may generate a first scan signal Scan1[n] using a gate voltage and a gate control signal received from a driver integrated circuit D-IC located outside the display panel 110, and may sequentially apply the first scan signal Scan1[n] to the plurality of gate lines GL during the scan period S/P.

In addition, the gate driving circuit 130 may receive a compensation signal corresponding to the gate low voltage VGL which has slightly increased due to the influence of the parasitic capacitor during the low voltage rising period (i.e., VGL Rising) from the driver integrated circuit D-IC located outside the display panel 110, and may apply the compensation signal in each of the remaining periods excluding the scan period S/P within the display driving period D/P, that is, in each of at least one compensation period C/P.

For example, the driver integrated circuit D-IC may determine the median value of the increased gate low voltage levels in the scan period S/P of a plurality of gate lines GL as a voltage level of the compensation signal, and may generate the compensation signal by tuning a first gate low voltage VGL whose voltage level has not increased based on the median value.

For example, the increased gate low voltage level in the scan period S/P may have a slight difference for each of the plurality of gate lines GL (i.e., each position), and the driver integrated circuit D-IC may calculate the increased gate low voltage level in the scan period S/P for each of the plurality of gate lines GL or each of the preset areas of the display panel 110 in advance, and determine the median (or average) of the calculated voltage levels as a voltage level of the compensation signal.

For a more specific example, assuming that the increased gate low voltage level in the upper region Top of the display panel 110 is 110 mV, a gate low voltage level in the middle region Middle is 100 mV, and a gate low voltage level in the lower region Bottom is 90 mV, the voltage level of the compensation signal may be determined as 100 mV.

That is, the display device 100 according to the embodiments of the present disclosure may compensate for the increased gate low voltage in the scan period S/P by applying a compensation signal in a compensation period C/P different from the scan period S/P, thereby reducing flicker and minimizing the flicker deviation between the upper region Top, middle region Middle, and lower region Bottom of the display panel 110.

Figure 6:
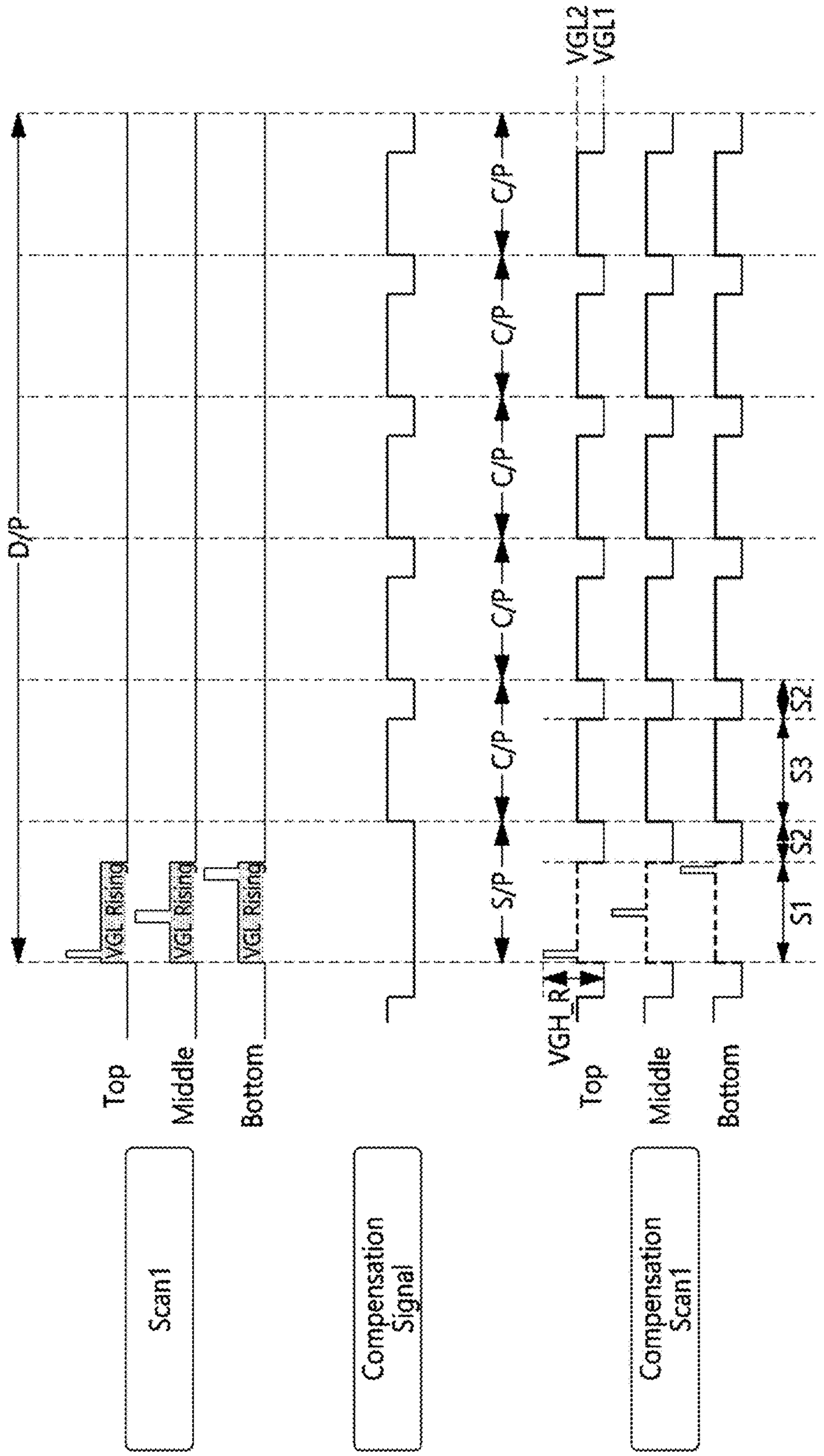
FIG. 6 is a diagram for explaining a high frequency compensation process performed in a display device according to embodiments of the present disclosure.

FIG. 6 is a diagram for explaining a high frequency compensation process performed in a display device according to embodiments of the present disclosure.

Referring to FIG. 6, the gate driving circuit 130 may generate and output a first scan signal Scan1[n] to be applied to at least one gate line among a plurality of gate lines GL during a scan period S/P among a preset display driving period D/P (e.g., 'Scan1' in FIG. 6).

The scan period S/P may include a low voltage rising period (VGL Rising) in which a gate low voltage VGL applied to a gate node (i.e., the first scan node) of the first transistor T1 slightly rises due to the influence of a parasitic capacitor formed between the second node (N2) of the subpixel SP and the gate node of the first transistor T1 before and after the timing at which the scan signal is applied to the plurality of gate lines, and a blank period (Blank) having a predetermined length after the low voltage rising period.

The gate driving circuit 130 may receive a compensation signal corresponding to the gate low voltage increased in the low voltage rising period (VGL Rising) (i.e., 'Compensation signal' in FIG. 6). Here, the compensation signal may mean a gate low voltage increased by a predetermined voltage from the original gate low voltage, and more specifically, may mean a toggle having a voltage level corresponding to the level of the gate low voltage VGL increased in the low voltage rising period (VGL Rising).

The gate driving circuit 130 may apply the compensation signal to the gate node of the first transistor T1 in each of the preset compensation periods C/P during the display driving period D/P.

The first transistor T1 may be a transistor capable of controlling the connection between the second node N2 and the third node N3 of the driving transistor DT by being turned on or off according to the first scan signal Scan1[n]. The second node N2 of the driving transistor DT may be a gate node, and the third node N3 of the driving transistor DT may be a drain node or a source node.

For example, the gate driving circuit 130 may include a plurality of sub-gate driving circuits which generate various types of gate signals supplied to the subpixels SP provided in the display panel 110.

For example, if the subpixels SP have a circuit structure as shown in FIG. 2, the plurality of sub-gate driving circuits included in the gate driving circuit 130 may include a first scan driver SCD1 which supplies a first scan signal, a second scan driver SCD2 which supplies a second scan signal, a third scan driver SCD3 which supplies a third scan signal, and an emission control driver EMD which supplies an emission control signal.

In addition, the gate driving circuit 130 may be configured with a plurality of stages, and each of the first scan driver SCD1, the second scan driver SCD2, the third scan driver SCD3, and the emission control driver EMD may be provided in at least one stage among the plurality of stages.

The first scan driver SCD1 equipped in the n-th stage may output a compensation signal to the first scan line SCL1 during the compensation period C/P of the display driving period D/P. Here, the compensation signal may be a type of the first scan signal Scan1[n], and may be a signal having a gate low voltage which is increased by a predetermined voltage compared to the original gate low voltage.

The second scan driver SCD2 equipped in the n-th stage may generate a second scan signal Scan2[n] output to a second scan line SCL2, and the third scan driver SCD3 equipped in the n-th stage may generate a third scan signal Scan3[n] output to a third scan line SCL3.

The emission control driver EMD equipped in the n-th stage may generate a first emission control signal EM[n] output to a first emission control signal line EML1, the emission control driver EMD equipped in the (n+1)-th stage may generate a second emission control signal EM[n+1] output to a second emission control signal line EML2, and the emission control driver EMD equipped in the (n+2)-th stage may generate a third emission control signal EM[n+2] output to a third emission control signal line EML3.

The compensation period C/P may include a compensation signal application period for applying a compensation signal and a blank period (Blank) having a predetermined length after the compensation signal application period, and a blank period included in the scan period S/P and a blank period included in each of the compensation periods C/P may be set to have the same length.

That is, the gate driving circuit 130 may apply a first scan signal Scan1[n] of a gate high voltage VGH level to the gate node of the first transistor T1 during the scan period S/P of the display driving period D/P, and may apply a compensation signal to the gate node of the first transistor T1 during each compensation period C/P other than the scan period S/P, thereby compensating for the increased gate low voltage VGL in the low voltage rising period (VGL Rising) (i.e., 'Compensation Scan1' in FIG. 6).

Hereinafter, the low voltage rising period (VGL Rising) may be described as a first signal section S1, the blank period may be described as ac second signal section S2, and a period for applying the compensation signal may be described as a third signal section S3.

In addition, the original gate low voltage may be described as a gate low voltage VGL1 of a first voltage level, and the increased gate low voltage (or compensation signal) may be described as a gate low voltage VGL2 of a second voltage level. In this case, the gate low voltage VGL1 of the first voltage level may mean a voltage of a lower level than the gate low voltage VGL2 of the second voltage level.

Referring to FIG. 6, the first signal section S1 may be a signal section having a variable gate high voltage VGH_R which is higher than the original gate high voltage, the second signal section S2 may be a signal section having a gate low voltage VGL2 of a second voltage level, and the third signal section S3 may be a signal section having a gate low voltage VGL1 of a first voltage level.

The voltage difference between the variable gate high voltage VGH_R and the original gate high voltage may correspond to the difference between the second voltage level and the first voltage level (i.e., VGL2−VGL1).

Figure 7:
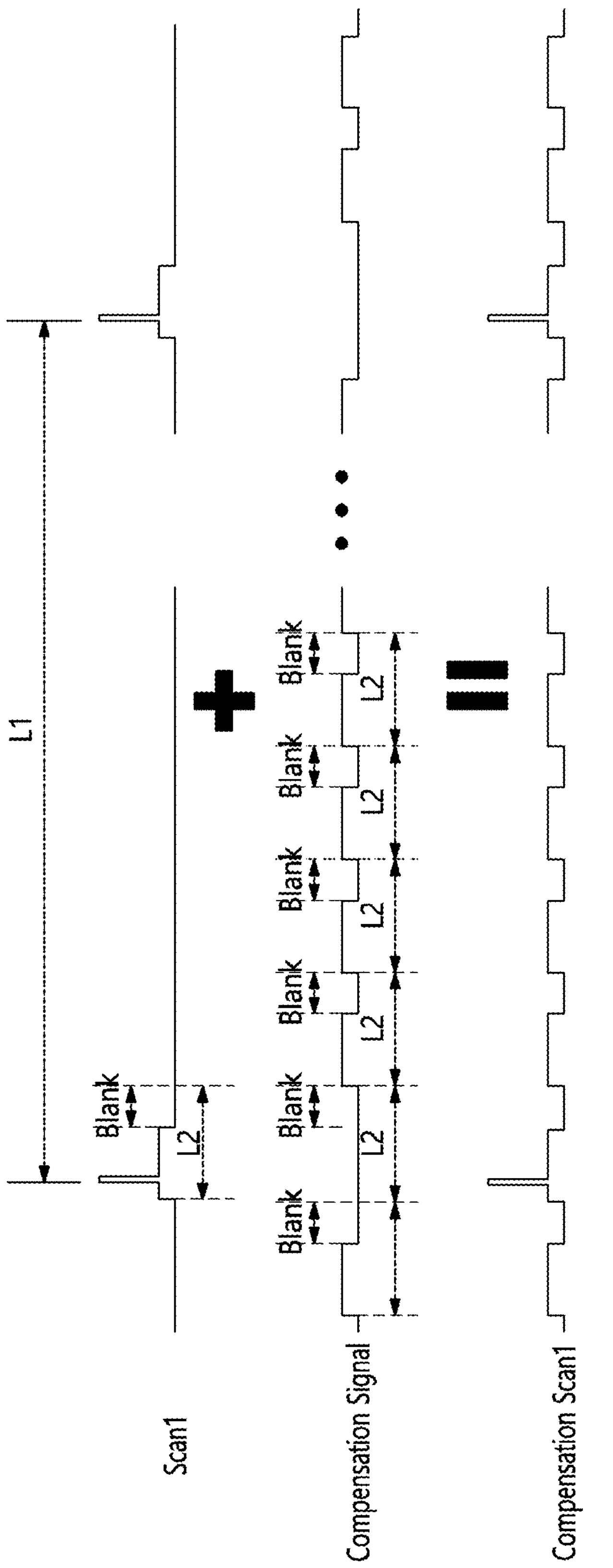
FIG. 7 is a diagram for further explaining a high frequency compensation process performed in a display device according to embodiments of the present disclosure.

FIG. 7 is a diagram for further explaining a high frequency compensation process performed in a display device 100 according to embodiments of the present disclosure.

Referring to FIG. 7, a length of the display driving period D/P may be set to L1, and a length of the scan period S/P may be set to L2. For example, L1 may be 10 Hz (0.1 sec), and L2 may be 120 Hz (approximately 0.00833 s).

Specifically, the display device 100 may perform low-speed driving of 10 Hz for implementation of low power. In this case, within the display driving period D/P, a total of 11 (i.e., 12-1 (scan period)) compensation toggles (i.e., compensation signals) may be applied based on the value obtained by dividing the length of the display driving period D/P by the length of the scan period S/P.

Similarly, if the display device 100 is driven at a low-speed of 24 Hz, the length of the display driving period D/P may be set to 24 Hz (approximately 0.0417 s), and the length of the scan period S/P may be set to 120 Hz (i.e., approximately 0.00833 s), so that a total of 4 (i.e., 5-1 (scan period)) compensation toggles (i.e., compensation signals) may be applied within the display driving period D/P.

That is, the lengths of the scan period S/P and the compensation period C/P within the display driving period D/P may be set to be the same. For example, the length of the scan period S/P and the length of the compensation period C/P may be set to be the same as 120 Hz, including the blank period.

Figure 8A:
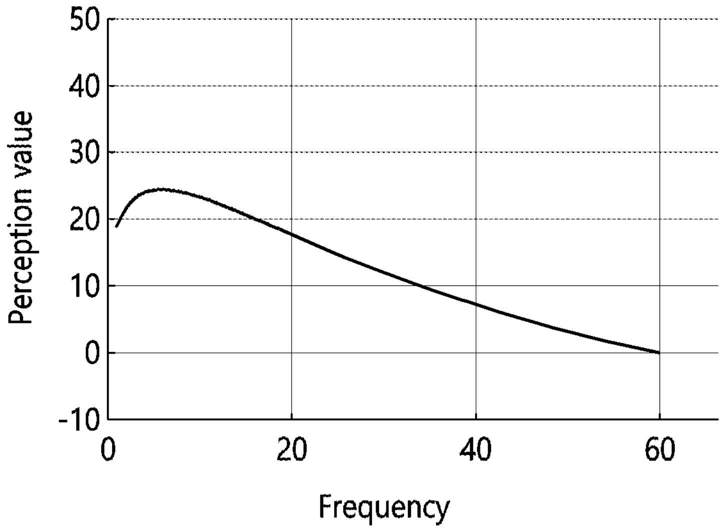
FIG. 8A to FIG. 8C are diagrams for explaining the results of performing high frequency compensation in a display device according to embodiments of the present disclosure.
Figure 8B:
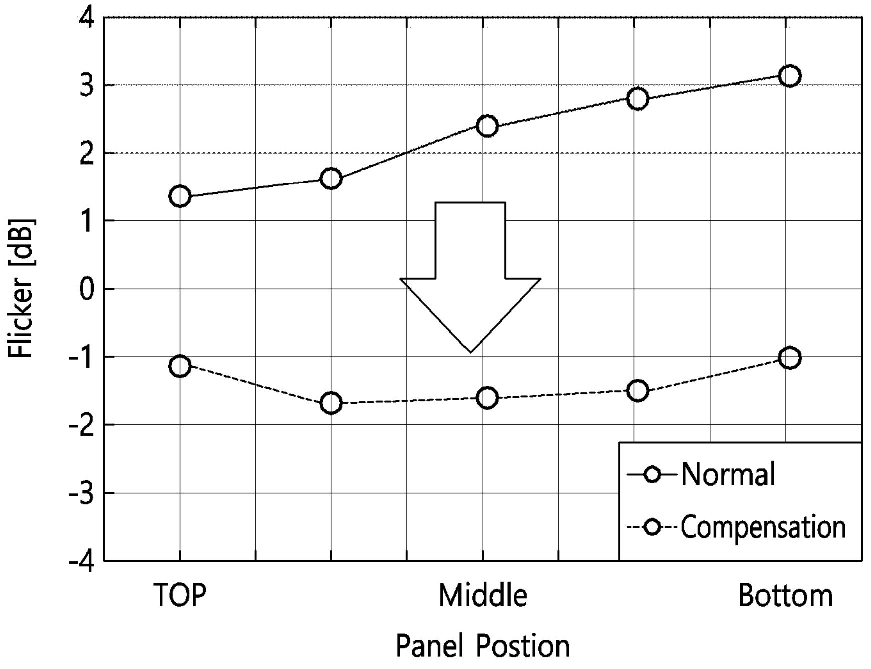
Figure 8C:
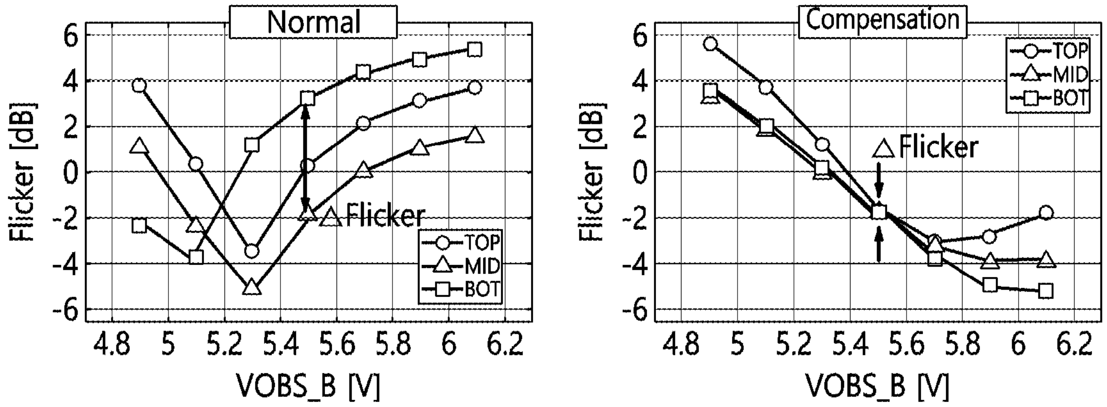

FIG. 8A to FIG. 8C are diagrams for explaining the results of performing high frequency compensation in a display device 100 according to embodiments of the present disclosure.

Specifically, FIG. 8A is a diagram explaining the flicker perception characteristics of a user, and illustrates the user's flicker perception value according to the change in frequency.

FIG. 8B is related to the verification result through the cell driving test, and illustrates the flicker test result by position (e.g., Top, Middle, Bottom) of the display panel 110.

'Flicker' shown in FIG. 8B and FIG. 8C is related to a flicker value, and more specifically, may mean a value according to the difference in the luminance waveform between a refresh period and a holding period when the display device 100 is driven at a specific frequency (e.g., 10 Hz). In addition, here, factors according to the flicker position deviation may the design factors such as the difference in the Vobs voltage and the rise of the gate low voltage (i.e., VGL Rising), and the driving factors such as the voltage/time optimization and gate low voltage compensation (i.e., VGL compensation).

FIG. 8C illustrates the flicker simulation results by position (e.g., Top, Middle, Bottom) of the display panel 110. Here, 'Vobs' may mean an on-bias-stress (OBS) voltage.

Referring to FIG. 8A, there has been identified that the user is likely to perceive flicker within a screen when the display device 100 is driven at a low speed, and in particular, there has been identified that the user is likely to perceive flicker when driven at a low speed of 10 Hz.

Referring to FIGS. 8B and 8C, due to the voltage level rising phenomenon of the gate low voltage VGL occurring at the gate node (i.e., the first scan node) of the first transistor T1 in the subpixel SP when the display device 100 is driven at a low speed (e.g., driven at 10 Hz), there has been appeared a flicker value dB that the user can perceive at each position (e.g., Top, Middle, Bottom) of the display panel 110. However, if high-frequency compensation is applied, there has been confirmed that the flicker value dB may be reduced at each position (e.g., Top, Middle, Bottom).

That is, the display device 100 according to the embodiments of the present disclosure may minimize the flicker difference according to the position (e.g., Top, Middle, Bottom) of the display panel 110 by compensating for the voltage level rising phenomenon (i.e., VGL Rising) of the gate low voltage VGL by applying a high-frequency input signal (i.e., a compensation signal).

Specifically, assuming that the gate driving circuit 130 performs low-speed driving at 10 Hz, the first scan signal Scan 1[n] including the increased gate low voltage VGL and the high-frequency compensation signal (including the blank period) of 120 Hz supplied from the driver integrated circuit D-IC may applied to the display panel 110, and through this high-frequency compensation process, the 10 Hz flicker component may be moved to the 120 Hz band, and the flicker component moved to 120 Hz may be attenuated due to the user's perception of flicker.

Referring to FIGS. 8B and 8C, although the flicker and VOBS voltage have been different from each other depending on the position (e.g., Top, Middle, Bottom) of the display panel 110, there has been confirmed that the flicker phenomenon and uniformity has been improved after the high-frequency compensation.

Figure 9:
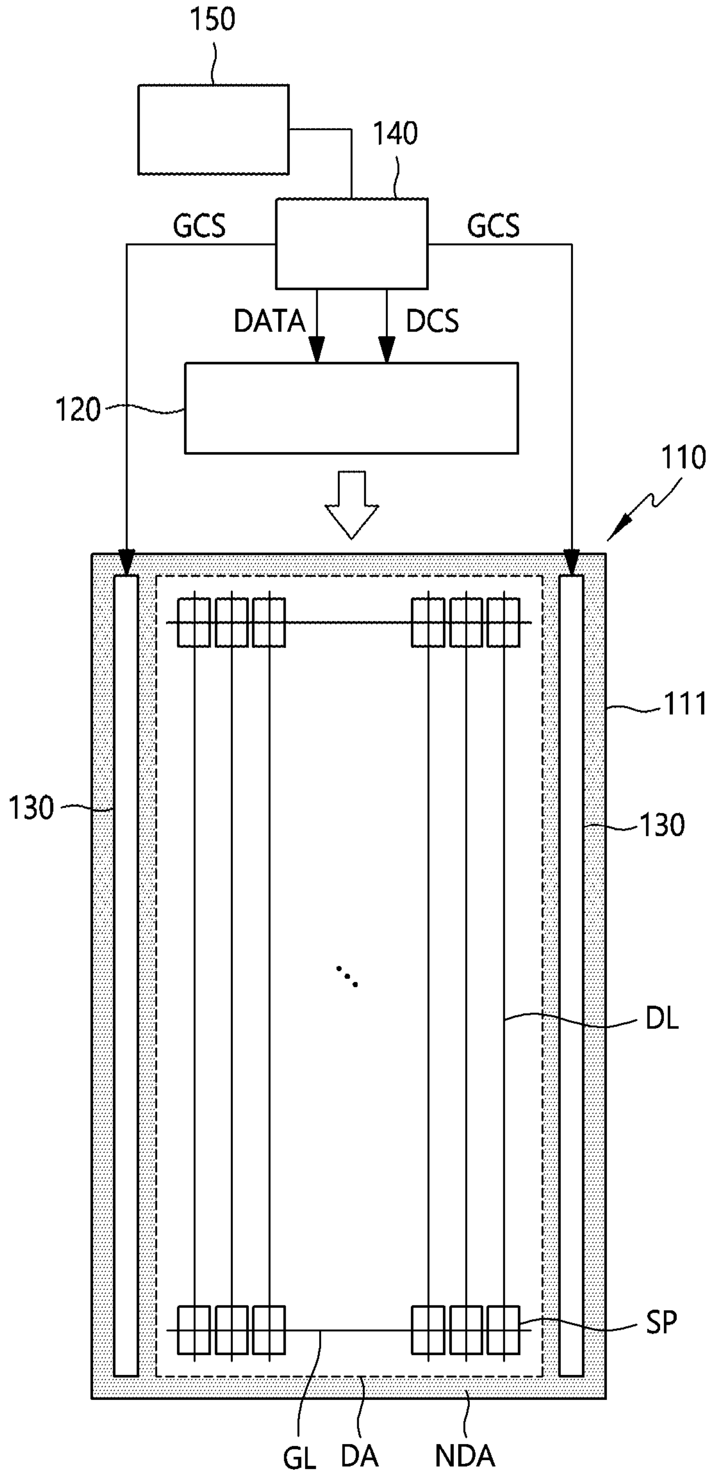
FIG. 9 is a diagram for explaining an implementation example of a display device according to embodiments of the present disclosure.

FIG. 9 is a diagram for explaining an implementation example of a display device 100 according to embodiments of the present disclosure.

Referring to FIG. 9, the display panel 110 may include a display area DA where an image is displayed and a non-display area NDA where an image is not displayed.

The display area DA may be an area where an image can be displayed, and may also be referred to as an active area. A plurality of subpixels SP for displaying an image may be disposed in the display area DA.

The non-display area NDA may be an area where an image is not displayed, and may be an outer area of the display area DA. The non-display area NDA may also be referred to as a bezel (or bezel area). The non-display area NDA may include a pad area.

For example, the non-display area NDA may include a first non-display area, a second non-display area, a third non-display area, and a fourth non-display area. The first non-display area may be located on the outer side of the display area DA in the row direction. The second non-display area may be located outside the display area DA in the row direction, and may be located on the opposite side of the first non-display area. The third non-display area may be located outside the display area DA in the column direction. The fourth non-display area may be located outside the display area DA in the column direction, and may be located on the opposite side of the third non-display area.

Among the first to fourth non-display areas, the fourth non-display area may include a pad area to which a driving circuit is connected or bonded (or joined), and the first to third non-display areas may have a very small size, but the embodiments of the present disclosure are not limited thereto.

For another example, a boundary area between the display area DA and the non-display area NDA may be bent so that the non-display area NDA may be located below the display area DA.

When a user views the display device 100 from the front, there may be little or no non-display area NDA visible to the user, but embodiments of the present disclosure are not limited thereto.

According to the example of FIG. 9, the data driving circuit 120 may receive image data DATA in digital form from the controller 140, convert the received image data DATA into an analog data signal (or also called a data voltage) and output the converted image data to a plurality of data lines DL.

The data driving circuit 120 may be connected to the display panel 110 in a tape-automated-bonding (TAB) manner, may be connected to the bonding pad of the display panel 110 in a chip-on-glass (COG) or chip-on-panel (COP) manner, or may be implemented in a chip-on-film (COF) manner and connected to the display panel 110, but is not limited thereto.

The gate driving circuit 130 may be implemented in a Gate-In-Panel (GIP) type, and may be formed in a non-display area NDA of the display panel 110. The gate driving panel circuit 130 may be disposed in both the non-display area NDA located at one outer side of the display area DA and the non-display area NDA located at the other outer side of the display area DA, but the embodiments of the present disclosure are not limited thereto, and the gate driving circuit 130 may be disposed in only one of the non-display area NDA located at one outer side of the display area DA and the non-display area NDA located at the other outer side of the display area DA.

As another example, the gate driving circuit 130 may be disposed in the display area DA of the display panel 110. As an example, the gate driving circuit 130 may be disposed in a first partial area within the display area DA (for example, a left area or a right area within the display area DA). As another example, the gate driving circuit 130 may be disposed in a first partial area (e.g., a left area or a right area within the display area DA) and a second partial area (e.g., a right area or a left area within the display area DA) within the display area DA. As another example, the gate driving circuit 130 may be disposed over the entire area of the display area DA.

If the gate driving circuit 130 is disposed in the display area DA of the display panel 110, the gate driving circuit 130 may vertically overlap with the subpixels SP disposed in the display area DA.

For example, the gate driving circuit 130 may be vertically overlapped with light emitting devices and transistors included in the subpixels SP disposed in the display area DA. The gate driving circuit 130 may be vertically overlapped with a plurality of light emitting devices and a plurality of transistors included in a plurality of subpixels SP disposed in the display area DA. The gate driving circuit 130 may include a plurality of transistors. Each of the plurality of transistors included in the gate driving circuit 130 may include an active layer including a first semiconductor material, and each of the plurality of transistors included in the subpixels SP may include an active layer including a second semiconductor material. As an example, the first semiconductor material and the second semiconductor material may be substantially the same. As another example, the first semiconductor material and the second semiconductor material may be different from each other. For example, the first semiconductor material may be a silicon-based semiconductor material (e.g., Low Temperature Poly Silicone (LTPS)), and the second semiconductor material may be an oxide semiconductor material. For example, the active layer may be a semiconductor layer, but is not limited thereto.

The controller 140 may be connected to a host system 150, may perform overall control functions related to driving the display panel 110, and may control the operation of the data driving circuit 120 and the gate driving circuit 130.

The display device 100 may further include a power management integrated circuit, and the power management integrated circuit may supply various voltages or currents to the data driving circuit 120 and the gate driving circuit 130, or control various voltages or currents to be supplied.

Hereinafter, for convenience of explanation, the controller 140 and/or the power management integrated circuit PMIC may be described as a driver integrated circuit D-IC.

The controller 140 of the display device 100 according to the embodiments of the present disclosure may output gate control signals GCS for gate driving to a gate driving circuit 130, for example, a plurality of GIP circuits GIPC.

For example, the gate driving circuit 130 may generate a plurality of gate signals (e.g., scan signals, emission control signals, etc.) based on gate control signals GCS received from the controller 140 and gate voltages received from the power management integrated circuit, and output the generated gate signals to a plurality of gate lines GL, respectively.

Meanwhile, the gate driving circuit 130 according to the embodiments of the present disclosure may receive a gate control signal, a gate voltage, and a compensation signal from a driver integrated circuit D-IC disposed outside the display panel 110.

The gate voltage may include at least one of a gate high voltage VGH and a gate low voltage VGL, and the gate voltage may further include at least one of an emission high voltage VEH and an emission low voltage VEL.

For example, the gate driving circuit 130 may receive a gate high voltage VGH and an emission high voltage VEH through a high-level gate voltage line, and may receive a gate low voltage VGL and an emission low voltage VEL through a low-level gate voltage line.

The compensation signal may be a signal generated in response to a change in the gate low voltage VGL in a scan period S/P during a display driving period D/P.

The gate driving circuit 130 may generate a scan signal based on at least one of the gate high voltage VGH and the gate low voltage VGL and a gate control signal. For example, the scan signal Scan may include at least one of a first scan signal Scan1[n], a second scan signal Scan2[n], and a third scan signal Scan3[n].

The gate driving circuit 130 may generate an emission control signal EM based on at least one of the emission high voltage VEH and the emission low voltage VEL, and the gate control signal.

The gate driving circuit 130 may output a scan signal and an emission control signal to at least one of the plurality of gate lines GL at corresponding timings based on the gate control signal.

The gate driving circuit 130 may output the first scan signal Scan1[n] to at least one of the plurality of gate lines GL in a scan period S/P among the display driving period D/P based on the gate control signal, and may output a compensation signal in at least one compensation period C/P excluding the scan period S/P among the display driving period D/P.

The gate driving circuit 130 may include at least one of a first scan driver SCD1, a second scan driver SCD2, a third scan driver SCD3, and an emission control driver EMD, and the first scan driver SCD1, the second scan driver SCD2, the third scan driver SCD3, and the emission control driver EMD will be described in more detail later with reference to FIGS. 11A to 11D.

Figure 10:
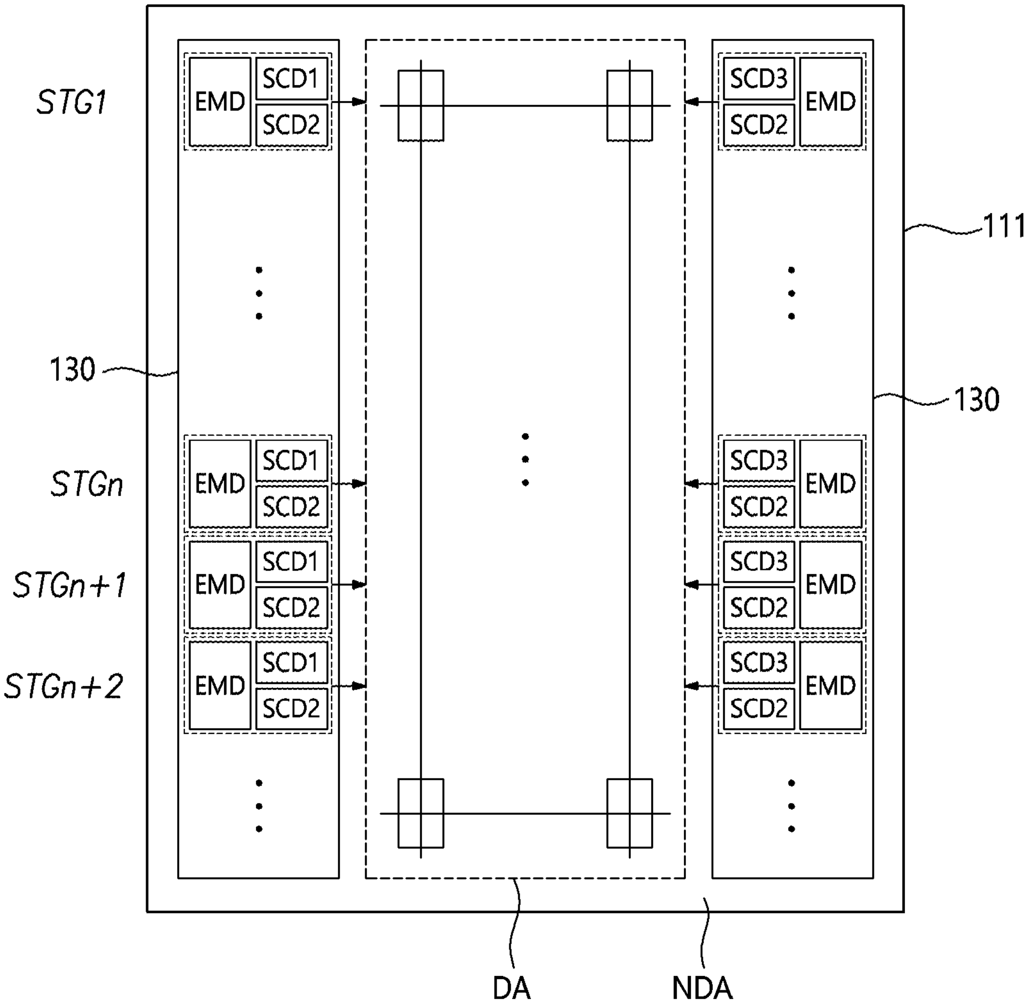
FIG. 10 is a diagram for explaining an implementation example of a gate driving circuit according to embodiments of the present disclosure.

FIG. 10 is a diagram for explaining an implementation example of a gate driving circuit 130 according to embodiments of the present disclosure.

Referring to FIG. 10, the gate driving circuit 130 may include a plurality of GIP circuits GIPC. The plurality of GIP circuits GIPC may be disposed in the non-display area NDA corresponding to each of the plurality of stages STG.

For example, the plurality of GIP circuits GIPC may include a GIP circuit GIPC disposed in the left non-display area NDA and a GIP circuit GIPC disposed in the right non-display area NDA based on the display area DA corresponding to each of the plurality of stages STG, but is not limited thereto. In addition, the GIP circuit GIPC may be disposed only in the non-display area NDA corresponding to either the left or right of the display area DA.

Each of the plurality of GIP circuits GIPC may include at least one of a first scan driver SCD1, a second scan driver SCD2, a third scan driver SCD3, and an emission control driver EMD.

According to the example of FIG. 10, a GIP circuit GIPC disposed in the left non-display area NDA may have the first scan driver SCD1 and the second scan driver SCD2 disposed in an area close to the display area DA, and the emission control driver EMD disposed in an area far from the display area DA.

A GIP circuit GIPC disposed in the right non-display area NDA may have the second scan driver SCD2 and the third scan driver SCD3 disposed in an area close to the display area DA, and the emission control driver EMD disposed in an area far from the display area DA.

That is, the second scan driver SCD2 may be disposed in both the GIP circuit GIPC placed in the left non-display area NDA and the GIP circuit GIPC placed in the right non-display area NDA.

The area of the emission control driver EMD in each of the plurality of GIP circuits GIPC may be wider than the first scan driver SCD1, the second scan driver SCD2, and the third scan driver SCD3, and the areas of each of the first scan driver SCD1, the second scan driver SCD2, and the third scan driver SCD3 may be the same.

However, the driver arrangement and the area of each driver in the GIP circuit GIPC are not limited thereto, and the driver arranged in each of the plurality of GIP circuits GIPC and the area of each driver may be designed and changed by the user.

Referring to FIG. 2 and FIG. 10, the first scan driver SCD1 provided in the n-th stage STGn may generate a first scan signal Scan1[n] output to the first scan line SCL1.

In addition, the first scan driver SCD1 equipped in the n-th stage STGn may output a compensation signal to the first scan line SCL1 during the compensation period C/P of the display driving period D/P. Here, the compensation signal may be a type of the first scan signal Scan1[n], and may be a signal having a gate low voltage which is increased by a predetermined voltage compared to the original gate low voltage.

The second scan driver SCD2 equipped in the n-th stage STGn may generate a second scan signal Scan2[n] output to the second scan line SCL2, and the third scan driver SCD3 equipped in the n-th stage may generate a third scan signal Scan3[n] output to the third scan line SCL3.

Meanwhile, the emission control driver EMD equipped in the n-th stage STGn may generate a first emission control signal EM[n] output to a first emission control signal line EML1, the emission control driver EMD equipped in the (n+1)-th stage STGn+1 may generate a second emission control signal EM[n+1] output to a second emission control signal line EML2, and the emission control driver EMD equipped in the (n+2)-th stage STGn+2 may generate a third emission control signal EM[n+2] output to a third emission control signal line EML3.

FIGS. 11A to 11D are diagrams for further explaining a gate driving circuit 130 of a display device 100 according to embodiments of the present disclosure.

Figure 11A:
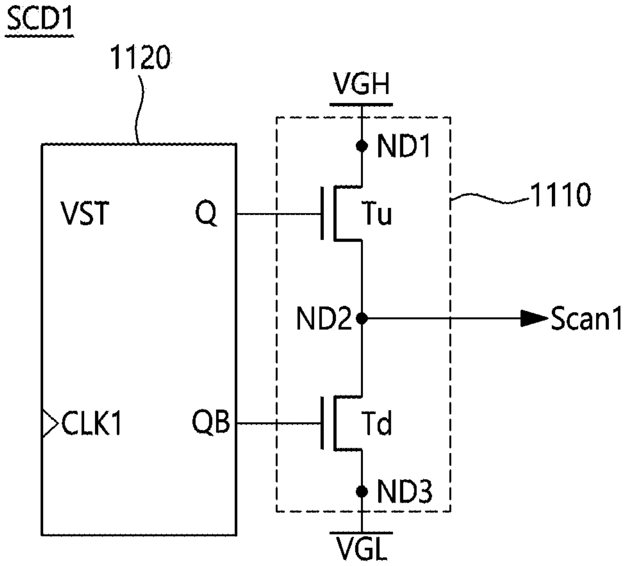
FIGS. 11A to 11D are diagrams for further explaining a gate driving circuit of a display device according to embodiments of the present disclosure.
Figure 11B:
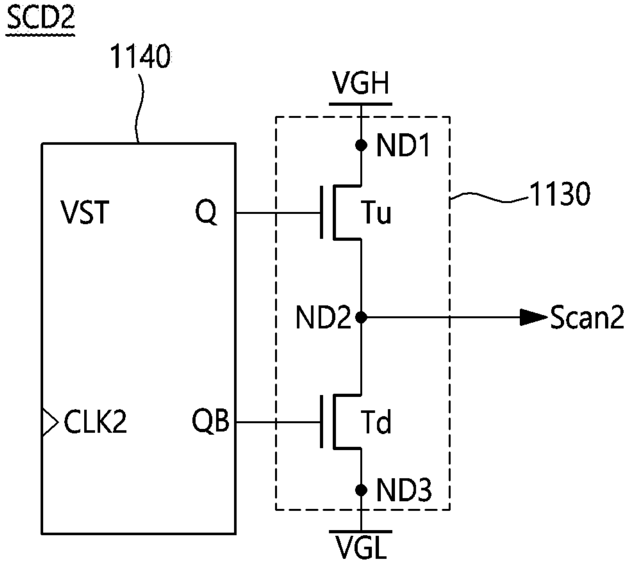
Figure 11C:
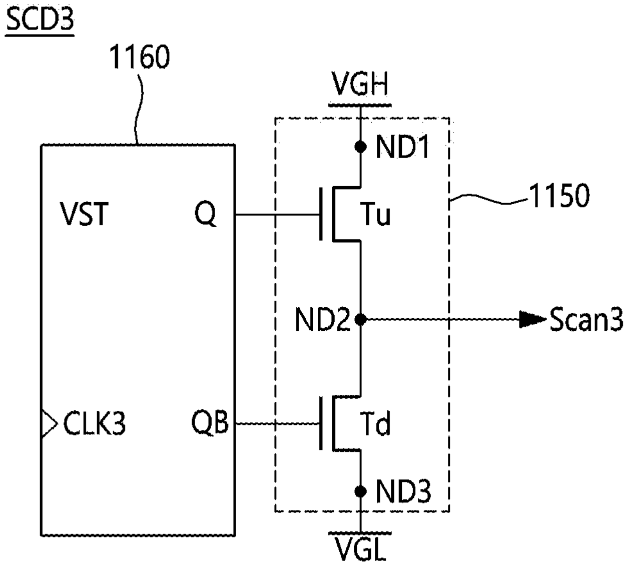
Figure 11D:
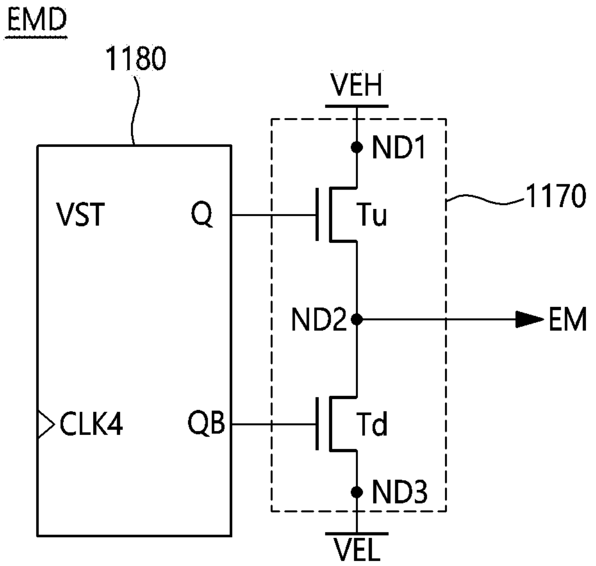

Specifically, FIG. 11A illustrates a first scan driver SCD1 included in the gate driving circuit 130, FIG. 11B illustrates a second scan driver SCD2 included in the gate driving circuit 130, FIG. 11C illustrates a third scan driver SCD3 included in the gate driving circuit 130, and FIG. 11D illustrates an emission control driver EMD included in the gate driving circuit 130.

Referring to FIGS. 11A to 11D, each of the first scan driver SCD1, the second scan driver SCD2, the third scan driver SCD3, and the emission control driver EMD may include a buffer circuit 1110, 1130, 1150 and 1170 and a control circuit 1120, 1140, 1160 and 1180, respectively.

Each of the buffer circuits 1110, 1130, 1150 and 1170 may include a pull-up transistor Tu connected between a first node ND1 and a second node ND2, and a pull-down transistor TD connected between a third node ND3 and a second node ND2.

Each of the control circuits 1120, 1140, 1160 and 1180 may control the voltage of a first control node (i.e., Q node) which is a gate node of the pull-up transistor Tu and a second control node (i.e., QB node) which is a gate node of the pull-down transistor TD.

Each of the buffer circuits 1110, 1130, 1150 and 1170 may output a gate driving signal to a gate line electrically connected to the second node.

Specifically, the buffer circuit 1110 of the first scan driver SCD1 may output a first scan signal Scan1, the buffer circuit 1130 of the second scan driver SCD2 may output a second scan signal Scan2, the buffer circuit 1150 of the third scan driver SCD3 may output a third scan signal Scan3, and the buffer circuit 1170 of the emission control driver EMD may output an emission control signal EM.

One of a first power supply voltage applied to the first node ND1 of the buffer circuit 1110, 1130 and 1150 of the first scan driver SCD1, the second scan driver SCD2 and the third scan driver SCD3, and a second power supply voltage applied to the third node ND3 may be a gate low voltage VGL, and the other may be a gate high voltage VGH higher than the gate low voltage VGL.

For example, if the pull-up transistor Tu and the pull-down transistor Td of each of the first scan driver SCD1, the second scan driver SCD2 and the third scan driver SCD3 are N-type transistors, the first power supply voltage may be a gate high voltage VGH and the second power supply voltage may be a gate low voltage VGL.

In addition, if the pull-up transistor Tu and the pull-down transistor Td of each of the first scan driver SCD1, the second scan driver SCD2 and the third scan driver SCD3 are P-type transistors, the first power voltage may be a gate low voltage VGL and the second power voltage may be a gate high voltage VGH.

One of a third power voltage applied to the first node ND1 of the emission control driver EMD and a fourth power voltage applied to the third node ND3 may be an emission low voltage VEL, and the other may be an emission high voltage VEH higher than the emission low voltage VEL.

For example, if the pull-up transistor Tu and the pull-down transistor Td of the emission control driver EMD are N-type transistors, the third power voltage may be an emission high voltage VEH and the fourth power voltage may be an emission low voltage VEL.

In addition, if the pull-up transistor Tu and the pull-down transistor Td of the emission control driver EMD are P-type transistors, the third power supply voltage may be an emission low voltage VEL, and the fourth power supply voltage may be an emission high voltage VEH.

Referring to FIG. 6 and FIG. 11A, the gate low voltage VGL applied to the third node ND3 of the first scan driver SCD1 may change or vary between a first voltage level VGL1 and a second voltage level VGL2 higher than the first voltage level VGL1 over time. In this case, the gate low voltage VGL may have the second voltage level VGL2 during a period in which the first scan signal Scan1 has a turn-on level voltage.

Specifically, the first scan signal Scan1 may include a first signal section S1 having a variable gate high voltage VGH_R which is higher than a gate high voltage VGH, a second signal section S2 having a gate low voltage VGL2 of a second voltage level, and a third signal section S3 having a gate low voltage VGL1 of a first voltage level.

A voltage difference between the variable gate high voltage VGH_R and the gate high voltage VGH may correspond to a difference between the second voltage level and the first voltage level (i.e., VGL2−VGL1).

According to the examples of FIGS. 11A to 11C, each of the first scan driver SCD1, the second scan driver SCD2, and the third scan driver SCD3 may be supplied with a start signal VST and first to third clock signals CLK1, CLK2 and CLK3 corresponding to each driver, a gate high voltage VGH may be supplied to a pull-up transistor Tu turned on or off depending on the voltage of the Q node, and a gate low voltage VGL may be supplied to a pull-down transistor Td turned on or off depending on the voltage of the QB node, thereby outputting a first scan signal Scan1, a second scan signal Scan2, and a third scan signal Scan3, respectively.

According to the example of FIG. 11D, the emission control driver EMD may generate the emission control signal EM based on a fourth clock signal CLK4 received from the controller 140 and the emission high voltage VEH and emission low voltage VEL received from the power management integrated circuit.

For example, the emission control driver EMD may generate the emission control signal EM by supplying the start signal VST and the fourth clock signal CLK4, supplying the emission high voltage VEH to the pull-up transistor Tu which is turned on or off according to the voltage of the Q node, and supplying the emission low voltage VEL to the pull-down transistor Td which is turned on or off according to the voltage of the QB node.

The first scan driver SCD1, the second scan driver SCD2, the third scan driver SCD3, and the emission control driver EMD may change the voltage of the output signal in accordance with the voltage of the start signal VST in synchronization with an edge of the clock CLK1 to CKL4 corresponding to each driver, so that an output signal may be generated with a waveform identical to the phase of the start signal VST. If the waveform of the start signal VST is changed, the waveform of the output signal may also be changed accordingly, and the input signal may overlap with the output signal.

Figure 12:
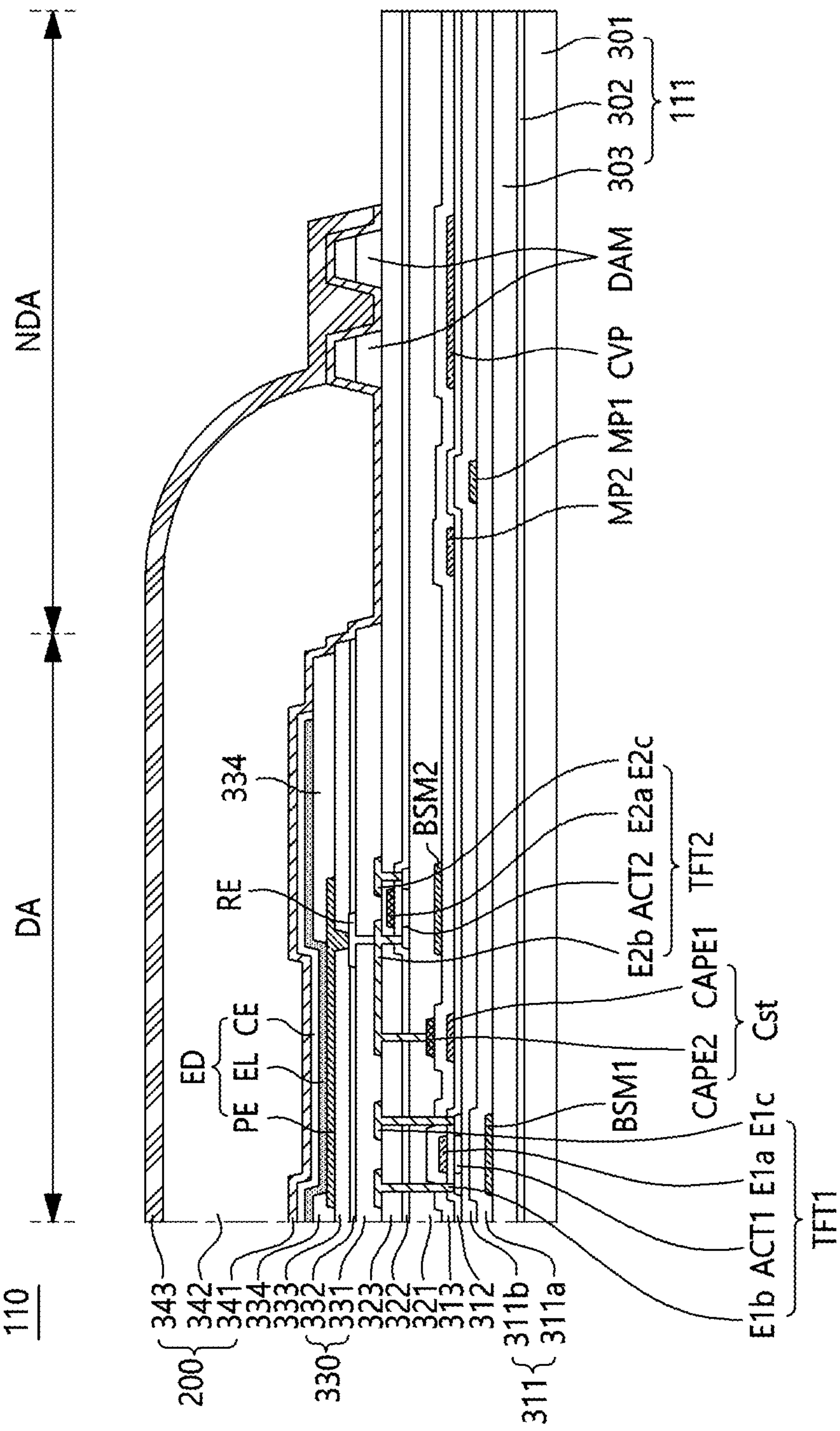
FIG. 12 is a diagram for explaining an implementation example of a display panel according to embodiments of the present disclosure.

FIG. 12 is a diagram for explaining an implementation example of a display panel 110 according to embodiments of the present disclosure.

Referring to FIG. 12, the display panel 110 according to embodiments of the present disclosure may include a transistor portion, a light emitting device portion, and an encapsulation portion, but the embodiments of the present disclosure are not limited thereto.

A substrate 111 may be a single layer or a multilayer. If the substrate 111 is a multilayer, the substrate 111 may include a first substrate 301, an intermediate substrate layer (or intermediate layer) 302, and a second substrate 303. The intermediate substrate layer 302 may be located between the first substrate 301 and the second substrate 303. For example, each of the first substrate 301 and the second substrate 303 may be a polyimide (PI) layer, but embodiments of the present disclosure are not limited thereto. The intermediate substrate layer 302 may be an inorganic insulating layer, but embodiments of the present disclosure are not limited thereto. The intermediate substrate layer 302 may block the charge from affecting the transistors placed on the second substrate 303 through the second substrate 303, which is a polyimide layer, when the charge is charged to the first substrate 301 as a polyimide layer.

In addition, the intermediate substrate layer 302 may block moisture components from penetrating upward through the first substrate 301. For example, the intermediate substrate layer 302 may be formed of a single layer of silicon nitride (SiNx) or silicon oxide (SiOx), or a multilayer thereof, and may also be formed of a double layer of silicon dioxide (SiO2) and silicon nitride (SiNx), but is not limited thereto.

The transistor portion may include a substrate 111, insulating layers 311, 312, 313, 321, 322 and 323 on the substrate 111, thin film transistors TFT1 and TFT2, a storage capacitor Cst, and various electrodes or signal lines.

The thin film transistors included in the transistor portion may include a first thin film transistor TFT1 and a second thin film transistor TFT2.

The first thin film transistor TFT1 may include a first active layer ACT1, a first electrode E1*a*, a second electrode E1*b*, and a third electrode E1*c*.

The first electrode E1*a* may be a gate electrode, the second electrode E1*b* may be a source electrode or a drain electrode, and the third electrode E1*c* may be a drain electrode or a source electrode. Hereinafter, for convenience of explanation, the first electrode E1*a* is referred to as a first gate electrode E1*a*, the second electrode E1*b* is referred to as a first source electrode E1*b*, and the third electrode E1*c* is referred to as a first drain electrode E1*c*. However, the embodiments of the present disclosure are not limited thereto.

The first active layer ACT1 may include a first semiconductor material, but the embodiments of the present disclosure are not limited thereto. For example, the first semiconductor material may include an oxide semiconductor, amorphous silicon, polysilicon, or low-temperature polysilicon (LTPS), but the embodiments of the present disclosure are not limited thereto. The first thin film transistor TFT1 may be implemented as a p-channel transistor or an n-channel transistor, but the embodiments of the present disclosure are not limited thereto.

The second thin film transistor TFT2 may include a second active layer ACT2, a fourth electrode E2*a*, a fifth electrode E2*b*, and a sixth electrode E2*c*.

The fourth electrode E2*a* may be a gate electrode, the fifth electrode E2*b* may be a source electrode or a drain electrode, and the sixth electrode E2*c* may be a drain electrode or a source electrode. Hereinafter, for convenience of explanation, the fourth electrode E2*a* is referred to as a second gate electrode E2*a*, the fifth electrode E2*b* is referred to as a second source electrode E2*b*, and the sixth electrode E2*c* is referred to as a second drain electrode E2*c*. However, the embodiments of the present disclosure are not limited thereto.

The second active layer ACT2 may include a second semiconductor material, and the embodiments of the present disclosure are not limited thereto. For example, the second semiconductor material may include an oxide semiconductor, amorphous silicon, polysilicon, or low-temperature polysilicon (LTPS), but embodiments of the present disclosure are not limited thereto. The second thin film transistor TFT2 may be implemented as a p-channel transistor or an n-channel transistor, but embodiments of the present disclosure are not limited thereto.

For example, one of the first active layer ACT1 of the first thin film transistor TFT1 and the second active layer ACT2 of the second thin film transistor TFT2 may include an oxide semiconductor material. For another example, one of the first active layer ACT1 of the first thin film transistor TFT1 and the second active layer ACT2 of the second thin film transistor TFT2 may include a low-temperature polysilicon semiconductor material. For another example, the first active layer ACT1 of the first thin film transistor TFT1 and the second active layer ACT2 of the second thin film transistor TFT2 may include an oxide semiconductor material. For another example, the first active layer ACT1 of the first thin film transistor TFT1 and the second active layer ACT2 of the second thin film transistor TFT2 may include a low-temperature polysilicon semiconductor material. For another example, among the first thin film transistor TFT1 and the second thin film transistor TFT2, a driving transistor DT may be configured with an oxide semiconductor as an active layer, and a scanning transistor ST may be configured with a low-temperature polysilicon as an active layer. For another example, among the first thin film transistor TFT1 and the second thin film transistor TFT2, the driving transistor DT may be configured with a low-temperature polysilicon as an active layer, and the scanning transistor ST may be configured with an oxide semiconductor as an active layer. For another example, the transistor included in the gate driving circuit 130 of the gate-in-panel (GIP) type may be configured with an oxide semiconductor or a low-temperature polysilicon as an active layer. For another example, all the transistors configured on the substrate 111 and the transistor included in the gate driving circuit 130 of the gate-in-panel (GIP) type may be configured with an oxide semiconductor as an active layer.

The second active layer ACT2 of the second thin film transistor TFT2 may be positioned higher from the substrate 111 than the first active layer ACT1 of the first thin film transistor TFT1.

A first buffer layer 311 may be located under the first active layer ACT1 of the first thin film transistor TFT1, and a second buffer layer 321 may be located under the second active layer ACT2 of the second thin film transistor TFT2. For example, the first active layer ACT1 of the first thin film transistor TFT1 may be positioned on the first buffer layer 311, and the second active layer ACT2 of the second thin film transistor TFT2 may be positioned on the second buffer layer 321. The second buffer layer 321 may be positioned higher than the first buffer layer 311.

The storage capacitor Cst may be disposed within various metal layers within the display panel 110. For example, the storage capacitor Cst may include a first capacitor electrode CAPE1 and a second capacitor CAPE2.

The light emitting device portion may include a plurality of light emitting device ED disposed on a planarization layer 330. Each of the plurality of light emitting device ED may include a pixel electrode PE, an emission layer EL, and a common electrode CE.

For example, the pixel electrode PE may be an anode electrode AND, and the common electrode CE may be a cathode electrode CAT.

The encapsulation portion may include an encapsulation layer 200 on a plurality of light emitting device ED. The encapsulation layer 200 may be a single layer or a multilayer, but the embodiments of the present disclosure are not limited thereto. In addition to the encapsulation layer 200, the encapsulation portion may further include a dam DAM.

Referring to FIG. 12, a first buffer layer 311 may be disposed on a substrate 111. The first buffer layer 311 may be a single layer or a multilayer, but the embodiments of the present disclosure are not limited thereto. If the first buffer layer 311 is a multilayer, the first buffer layer 311 may include a lower buffer layer 311*a* and an upper buffer layer 311*b*.

The first active layer ACT1 of the first thin film transistor TFT1 may be disposed on the first buffer layer 311. The first active layer ACT1 may include a channel region in which a channel is formed, a source connection region on one side of the channel region, and a drain connection region on the other side of the channel region.

A first insulating layer 312 may be disposed on the first active layer ACT1 of the first thin film transistor TFT1. The first gate electrode E1*a* of the first thin film transistor TFT1 may be disposed on the first insulating layer 312. A second insulating layer 313 may be disposed on the first gate electrode E1*a* of the first thin film transistor TFT1. The first insulating layer 312 may be a gate insulating layer, but the embodiments of the present disclosure are not limited thereto. The second insulating layer 313 may be an interlayer insulating layer, but the embodiments of the present disclosure are not limited thereto.

The second buffer layer 321 may be disposed on the second insulating layer 313.

The second active layer ACT2 of the second thin film transistor TFT2 may be disposed on the second buffer layer 321. The second active layer ACT2 may include a channel region in which a channel is formed, a source connection region on one side of the channel region, and a drain connection region on the other side of the channel region.

A third insulating layer 322 may be disposed on the second active layer ACT2 of the second thin film transistor TFT2. The second gate electrode E2*a* of the second thin film transistor TFT2 may be disposed on the third insulating layer 322. The fourth insulating layer 323 may be disposed on the second gate electrode E2*a* of the second thin film transistor TFT2. The third insulating layer 322 may be a gate insulating layer, but the embodiments of the present disclosure are not limited thereto. A fourth insulating layer 323 may be an interlayer insulating layer, but the embodiments of the present disclosure are not limited thereto.

The first source electrode E1*b* and the first drain electrode E1*c* of the first thin film transistor TFT1 and the second source electrode E2*b* and the second drain electrode E2*c* of the second thin film transistor TFT2 may be disposed on the fourth insulating layer 323.

The first source electrode E1*b* and the first drain electrode E1*c* of the first thin film transistor TFT1 may be connected to the source connection region and the drain connection region of the first active layer ACT1 through the holes of the fourth insulating layer 323, the third insulating layer 322, the second buffer layer 321, the second insulating layer 313, and the first insulating layer 312, respectively.

The second source electrode E2*b* and the second drain electrode E2*c* of the second thin film transistor TFT2 may be connected to the source connection region and the drain connection region of the second active layer ACT2 through the holes of the fourth insulating layer 323 and the third insulating layer 322, respectively.

The first source electrode E1*b* and the first drain electrode E1*c* of the first thin film transistor TFT1, and the second source electrode E2*b* and the second drain electrode E2*c* of the second thin film transistor TFT2 may include a first metal, and may be disposed within a first metal layer. Here, the first metal and the first metal layer may be referred to as a first source-drain metal and a first source-drain metal layer.

Referring to FIG. 12, as an example, the storage capacitor Cst may be formed by a first capacitor electrode CAPE1 and a second capacitor electrode CAPE2. In some cases, the storage capacitor Cst may be formed by three or more capacitor electrodes, and may be in the form of two or more capacitors connected in parallel.

Each of the first capacitor electrode CAPE1 and the second capacitor electrode CAPE2 may be disposed on various metal layers disposed within the display panel 110.

For example, the first capacitor electrode CAPE1 may include the same first gate metal as the first gate electrode E1*a* of the first thin film transistor TFT1 on the first insulating layer 312, and may be disposed within the first gate metal layer, but the embodiments of the present disclosure are not limited thereto. For example, the second capacitor electrode CAPE2 may be disposed on the second insulating layer 313.

The second source electrode E2*b* of the second thin film transistor TFT2 may be electrically connected to the second capacitor electrode CAPE2 through a hole of the fourth insulating layer 323, the third insulating layer 322, and the second buffer layer 321.

For example, if the subpixel SP is configured as in FIG. 2, the first thin film transistor TFT1 may be the first transistor T1 of FIG. 2, and the second thin film transistor TFT2 may be the driving transistor DT of FIG. 2.

The transistor portion may further include metal layers MP1 and MP2. For example, a first metal layer MP1 may be disposed between the lower buffer layer 311*a* and the upper buffer layer 311*b* included in the first buffer layer 311, but the embodiments of the present disclosure are not limited thereto. A second metal layer MP2 may include the same first gate metal as the first gate electrode E1*a* of the first thin film transistor TFT1 and may be disposed within the first gate metal layer, but the embodiments of the present disclosure are not limited thereto. The first metal layer MP1 may be a first metal pattern, and the second metal layer MP2 may be a second metal pattern, but the embodiments of the present disclosure are not limited thereto.

Each of the first metal layer MP1 and the second metal layer MP2 may be disposed in the display area DA or the non-display area NDA.

Referring to FIG. 12, the transistor portion may further include a first shield pattern BSM1 disposed on the substrate 111. The first shield pattern BSM1 may overlap with the first active layer ACT1 of the first thin film transistor TFT1. The first shield pattern BSM1 may be disposed under the first active layer ACT1 of the first thin film transistor TFT1. For example, the first shield pattern BSM1 may be disposed between the substrate 111 and the first buffer layer 311, or may be disposed between the lower buffer layer 311*a* and the upper buffer layer 311*b*.

The transistor portion may further include a second shield pattern BSM2 disposed on the substrate 111. The second shield pattern BSM2 may overlap with the second active layer ACT2 of the second thin film transistor TFT2. The second shield pattern BSM2 may be disposed under the second active layer ACT2 of the second thin film transistor TFT2. For example, the second shield pattern BSM2 may be disposed in a metal layer between the second insulating layer 313 and the second buffer layer 321. The second shield pattern BSM2 may be disposed in the same metal layer as the second capacitor CAPE2, but the embodiments of the present disclosure are not limited thereto. For another example, the second shield pattern BSM2 may be disposed in the same first gate metal layer as the first gate electrode Ela of the first thin film transistor TFT1.

Referring to FIG. 12, the transistor portion may further include a common driving signal layer CVP to which a common driving signal is applied. The common driving signal layer CVP may be disposed in a display area DA or a non-display area NDA.

For example, the common driving signal applied to the common driving signal layer CVP may be referred to as a power signal, and may include at least one of a driving voltage VDD and a base voltage VSS. The driving voltage VDD may also be referred to as a high-potential driving voltage (e.g., high-potential power voltage or high-potential voltage), and the base voltage VSS may also be referred to as a low-potential driving voltage (e.g., low-potential power voltage or low-potential voltage).

The planarization layer 330 may be disposed on the first thin film transistor TFT1 and the second thin film transistor TFT2, and may be disposed under the light emitting device ED. The planarization layer 330 may be an organic insulating layer including an organic insulating material.

For example, the planarization layer 330 may be composed of one layer. As another example, the planarization layer 330 may include two layers. The planarization layer 330 may include a first planarization layer 331 and a second planarization layer 332. As another example, the planarization layer 330 may include three or more layers. Embodiments of the present disclosure are not limited thereto.

Referring to FIG. 12, the first planarization layer 331 may be disposed on the first source electrode E1*b* and the first drain electrode E1*c* of the first thin film transistor TFT1 and the second source electrode E2*b* and the second drain electrode E2*c* of the second thin film transistor TFT2. For example, the first planarization layer 331 may be disposed on the first thin film transistor TFT1 and the second thin film transistor TFT2. For example, the first planarization layer 331 may be disposed while covering both the first thin film transistor TFT1 and the second thin film transistor TFT2.

Referring to FIG. 12, a relay electrode RE may be disposed on the first planarization layer 331. The relay electrode RE may electrically connect the second source electrode E2*b* of the second thin film transistor TFT2 and the pixel electrode PE.

The relay electrode RE may be electrically connected to the second source electrode E2*b* of the second thin film transistor TFT2 through a hole of the first planarization layer 331. The second source electrode E2*b* of the second thin film transistor TFT2 may be electrically connected to the second capacitor electrode CAPE2 of the storage capacitor Cst.

The relay electrode RE may be disposed in a second metal layer on the first planarization layer 331, and may include a second metal. The second metal and the second metal layer may be referred to as a second source-drain metal and a second source-drain metal layer.

The second planarization layer 332 may be disposed on the relay electrode RE.

Referring to FIG. 12, the light emitting device portion may be disposed on the second planarization layer 332. The light emitting device ED may be formed on the second planarization layer 332. The light emitting device ED may include a pixel electrode PE, an emission layer EL, and a common electrode CE. An emission area of the light emitting device ED may be formed in an area where the pixel electrode PE, the emission layer EL and the common electrode CE overlap and contact each other.

The pixel electrode PE may be disposed on a second planarization layer 332. The pixel electrode PE may be electrically connected to the relay electrode RE through a hole of the second planarization layer 332.

A bank 340 may be disposed on the pixel electrode PE. An opening of the bank 340 may expose a part of the pixel electrode PE to form an emission area. The opening of the bank 340 may overlap with a part of the pixel electrode PE.

For example, the bank 340 may be composed of a material including a black pigment, or an organic material such as a benzocyclobutene resin, a polyimide resin, an acrylic resin, or a photosensitive polymer, but the embodiments of the present disclosure are not limited thereto. If the bank 340 is composed of a material including a black pigment or a black dye, the bank may be a black bank. If the bank 340 is composed of a material including a black pigment or a black dye, the bank may block light from the outside or light reflected from the outside, so that there may further improve the brightness or the luminance of the display device 100.

The emission layer EL of the light emitting device ED may be disposed on a part of the pixel electrode PE and the bank 340. The common electrode CE may be disposed on the emission layer EL.

Referring to FIG. 12, the encapsulation portion may be disposed on the light emitting device portion, and may be located on the common electrode CE. The encapsulation portion may include an encapsulation layer 200 formed on the common electrode CE.

The encapsulation layer 200 may prevent moisture or oxygen from penetrating into the light emitting device ED. For example, the encapsulation layer 200 may prevent moisture or oxygen from penetrating into an organic material included in the emission layer EL of the light emitting device ED. The encapsulation layer 200 may be composed of a single layer or a multilayer, but the embodiments of the present disclosure are not limited thereto.

For example, the encapsulation layer 200 may include a first encapsulation layer 341, a second encapsulation layer 342, and a third encapsulation layer 343, but embodiments of the present disclosure are not limited thereto. For example, the first encapsulation layer 341 and the third encapsulation layer 343 may include inorganic encapsulation layers, and the second encapsulation layer 342 may include an organic encapsulation layer, but embodiments of the present disclosure are not limited thereto.

Embodiments of the present disclosure described above are briefly described as follows.

A display device according to embodiments of the present disclosure may include a display panel on which a plurality of gate lines, a plurality of data lines and a plurality of subpixels are disposed, a gate driving circuit for supplying a scan signal to the plurality of gate lines during a display driving period, and a data driving circuit for supplying a data voltage to the plurality of data lines.

The gate driving circuit may apply a compensation signal corresponding to a change in gate low voltage in a scan period to at least one gate line among the plurality of gate lines in each of at least one compensation period excluding a scan period during which the scan signal is applied to the plurality of gate lines during the display driving period.

A voltage level of the compensation signal may be the median value of an increased gate low voltage level in the scan period corresponding to each of the plurality of gate lines.

A length of the compensation period may be equal to a length of the scan period.

The scan period may include a low voltage rising period in which a gate low voltage slightly increases at a node to which the scan signal is applied due to an influence of a parasitic capacitor before and after a timing at which the scan signal is applied to the plurality of gate lines, and a blank period.

The scan period and the compensation period may include a blank period, and a length of a blank period included in the scan period may be equal to a length of a blank period included in the compensation period.

The scan period may include a refresh frame period corresponding to the timing at which the scan signal is applied, and at least one anode reset frame period.

Each of the plurality of subpixels may include a driving transistor, a first transistor connecting a second node corresponding to a gate electrode of the driving transistor and a third node corresponding to a second electrode of the driving transistor.

The gate driving circuit may supply the scan signal and the compensation signal to a gate node of the first transistor.

The gate driving circuit may include at least one gate-in-panel (GIP) circuit disposed in the display panel.

The gate driving circuit may receive a gate voltage and the compensation signal from a driver integrated circuit disposed outside the display panel, and generate the scan signal based on the gate voltage.

The driver integrated circuit may generate the compensation signal based on the gate low voltage among the gate voltages.

A gate driving circuit according to embodiments of the present disclosure may include a buffer circuit including a pull-up transistor connected between a first node and a second node and a pull-down transistor connected between a third node and the second node, and a control circuit configured to control a voltage of a first control node which is a gate node of the pull-up transistor, and a voltage of a second control node which is a gate node of the pull-down transistor.

The buffer circuit may output a gate signal to a gate line electrically connected to the second node.

One of a first power voltage applied to the first node and a second power voltage applied to the third node may be a gate low voltage, and the other may be a gate high voltage higher than the gate low voltage.

The gate low voltage may change between a first voltage level and a second voltage level higher than the first voltage level over time, and may have the second voltage level during a period in which the gate signal has a turn-on level voltage.

The gate signal may include a first signal section having a variable gate high voltage higher than the gate high voltage, a second signal section having the gate low voltage of the second voltage level, and a third signal section having the gate low voltage of the first voltage level.

A voltage difference between the variable gate high voltage and the gate high voltage may correspond to a difference between the second voltage level and the first voltage level.

The buffer circuit may output a first scan signal having the first signal section, the second signal section and the third signal section as the gate signal to the gate line.

The buffer circuit may output at least one signal among a second scan signal, a third scan signal, and a emission control signal as the gate signal to the gate line.

A display device according to embodiments of the present disclosure may include a display panel on which a plurality of gate lines, a plurality of data lines and a plurality of subpixels are disposed, and a gate driving circuit configured to supply a gate signal to the plurality of gate lines based on a gate high voltage and a gate low voltage.

The gate driving circuit may supply the gate signal including a first signal section having a variable gate high voltage higher than the gate high voltage, a second signal section having the gate low voltage at a second voltage level, and a third signal section having the gate low voltage at a first voltage level lower than the second voltage level.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure.

The various embodiments described above can be combined to provide further embodiments. Aspects of the embodiments can be modified, if necessary to employ concepts of the various embodiments to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A display device comprising:

a display panel on which a plurality of gate lines, a plurality of data lines and a plurality of subpixels are disposed;

a gate driving circuit for supplying a scan signal to the plurality of gate lines during a display driving period; and a data driving circuit for supplying a data voltage to the plurality of data lines, wherein the gate driving circuit is configured to apply a compensation signal corresponding to a change in a gate low voltage in a scan period to at least one gate line among the plurality of gate lines in each of at least one compensation period excluding a scan period during which the scan signal is applied to the plurality of gate lines during the display driving period, and wherein the scan period and the compensation period each include a blank period, and a length of a blank period included in the scan period is equal to a length of a blank period included in the compensation period.

2. The display device of claim 1, wherein a length of the compensation period is equal to a length of the scan period.

3. The display device of claim 1, wherein the scan period includes a blank period and a low voltage rising period in which a gate low voltage increases at a node to which the scan signal is applied due to an influence of a parasitic capacitor before and after a timing at which the scan signal is applied to the plurality of gate lines.

4. The display device of claim 1, wherein the scan period includes a refresh frame period corresponding to the timing at which the scan signal is applied, and at least one anode reset frame period.

5. The display device of claim 1, wherein each of the plurality of subpixels includes a driving transistor and a first transistor connecting a second node corresponding to a gate electrode of the driving transistor and a third node corresponding to a second electrode of the driving transistor, wherein the gate driving circuit is configured to supply the scan signal and the compensation signal to a gate node of the first transistor.

6. The display device of claim 1, wherein the gate driving circuit includes at least one gate-in-panel circuit disposed in the display panel.

7. The display device of claim 1, wherein the gate driving circuit is configured to receive gate voltages and the compensation signal from a driver integrated circuit disposed outside the display panel, and to generate the scan signal based on the gate voltages.

8. The display device of claim 7, wherein the driver integrated circuit is configured to generate the compensation signal based on the gate low voltage among the gate voltages.

9. A display device comprising:

a display panel on which a plurality of gate lines, a plurality of data lines and a plurality of subpixels are disposed;

a gate driving circuit for supplying a scan signal to the plurality of gate lines during a display driving period; and a data driving circuit for supplying a data voltage to the plurality of data lines, wherein the gate driving circuit is configured to apply a compensation signal corresponding to a change in a gate low voltage in a scan period to at least one gate line among the plurality of gate lines in each of at least one compensation period excluding a scan period during which the scan signal is applied to the plurality of gate lines during the display driving period, and wherein a voltage level of the compensation signal is a median value of an increased gate low voltage level in the scan period corresponding to each of the plurality of gate lines.

10. A display device comprising:

a display panel on which a plurality of gate lines, a plurality of data lines and a plurality of subpixels are disposed; and a gate driving circuit configured to supply a gate signal to the plurality of gate lines based on a gate high voltage and a gate low voltage, wherein the gate driving circuit is configured to supply the gate signal including a first signal section having a variable gate high voltage higher than the gate high voltage, a second signal section having the gate low voltage at a first voltage level, and a third signal section having the gate low voltage at a second voltage level higher than the first voltage level, wherein the gate signal is supplied during a display driving period including a scan period and at least one compensation period, the scan period including the first signal section and the second signal section, and the at least one compensation period including the third signal section and the second signal section, and wherein a length of the second signal section included in the scan period is equal to a length of the second signal section included in the at least one compensation period.

* * * * *